US005724255A

United States Patent [19]

Smith et al.

[11] Patent Number: 5,724,255
[45] Date of Patent: Mar. 3, 1998

[54] PORTABLE EMERGENCY ACTION SYSTEM FOR CHEMICAL RELEASES

[75] Inventors: Verne E. Smith, Cheyenne; David C. Sheesley, Laramie; Samuel B. King, Laramie; Thayne K. Routh, Laramie; John S. Nordin, Laramie, all of Wyo.

[73] Assignee: The University of Wyoming Research Corporation, Laramie, Wyo.

[21] Appl. No.: 703,863

[22] Filed: Aug. 27, 1996

[51] Int. Cl.$^6$ ............................ G06F 19/00; G08B 17/30
[52] U.S. Cl. .................... 364/500; 364/496; 364/420; 364/578; 364/806; 364/221.2; 364/222.1; 364/916.3; 395/500; 395/920; 395/928; 395/930; 395/932; 395/22; 340/515; 340/517; 340/632
[58] Field of Search ................. 364/500, 578–580, 364/496, 420, 550, 800–803, 806, 221, 221.1–221.2, 221.9, 264.3–264.5, 274.9, 916.3, DIG. 1–2; 395/10, 20–23, 50, 68, 903, 906, 920, 928, 930, 932, 500; 340/515–517, 505, 506, 632, 286.01

[56] References Cited

U.S. PATENT DOCUMENTS

| | | | |
|---|---|---|---|
| 5,019,998 | 5/1991 | Cowan et al. | 364/496 |
| 5,105,365 | 4/1992 | McDaniel et al. | 364/496 |
| 5,414,408 | 5/1995 | Berra | 340/525 |
| 5,648,914 | 7/1997 | Bauer et al. | 364/496 |
| 5,648,919 | 7/1997 | Yamauchi et al. | 364/578 |
| 5,664,112 | 9/1997 | Sturgeon et al. | 705/28 |

OTHER PUBLICATIONS

"Automated decision support for the emergency manager", Hwang et al, Federal Emergency Management Agency, MILCOM '92, pp. 0130–0133, 1992.

"An information lifeline to the disaster area: the emergency response link", O'Conner et al, Office of the Manager, National Communications System, MILCOM '95, Universal Communications, Conference record, pp. 838–841, Jul. 1995.

"Disaster area architecture:telecommunications support to disaster response and recovery", Phillip et al, Office of the Manager, National Communications System, MILCOM '95, Universal Communications, Conference record, pp. 833–837, Jul. 1995.

"An artifical neural network for oil spill cleanup: the MUSE system", Jean–Francois Arcand, Performance Support Systems Group–Center for Information Technology Inovation, Quebec, Canada,Electrical & Computer Engineering, 1995 Canadian Conference, pp. 519–522, Sep. 1995.

"AIN applications to support NS/EP disaster response and recovery", Luka et al, Office of Manager, National Communications System, MILCOM '95, Universal Communications, Conference record, pp. 843–847, Jul. 1995.

Bee–line software brochure for atmospheric dispersions.
EPI software brochure, by Homann Associates, Published Dec., 1992.
PHAST software brochure by DNV Industry/DNV Technica, date unknown.

(List continued on next page.)

Primary Examiner—James P. Trammell
Assistant Examiner—Tuan Q. Dam
Attorney, Agent, or Firm—Brit Nelson

[57] ABSTRACT

The present invention provides a calculated protective action zone, such as a safety zone which can be used for evacuation purposes, using simplified input methods and systems and simplified internal calculation methods to model the chemical data. Yet, it uniquely retains a significantly high degree of accuracy corresponding to more expensive, complicated, time consuming state of the art models for the chemical releases as described above. It may be used for dense gas dispersion and other releases. To accomplish this, the methods and systems of the present invention may use a post-processed modeled data base and selected multi-variable equations combined with qualitative and quantitative input and may include default values for various factors. The system may include a small, hand-held electronic calculating element such as a palmtop computer, with extended battery life for portability, although it is equally applicable for high end processors on stationary computers.

74 Claims, 28 Drawing Sheets

OTHER PUBLICATIONS

Breeze Haz software brochure by Trinity Consultants, Inc., Published Nov., 1995.

1996 North American Emergency Response Guidebook for Windows, copyright 1996.

1996 North American Emergency Response Guidebook in hardcopy form, 1996.

1993 Emergency Response Guidebook.

Chemistry Set Software brochure by SanSoft, date unknown.

HGSYSTEM User's Manual, L. Post, Shell Research Limited, Thornton Research Centre, Chester, U.K., Published 1994.

Technical Guidance for Hazards Analysis, "Emergency Planning for Extremely Hazardous Substances", U.S. Environmental Protection Agency, Federal Emergency Management Agency, U.S. Department of Transportation, Published Dec., 1987.

User's Manual for Slab: "An Atmospheric Dispersion Model for Denser–Than–Air Releases", Donald L. Ermak, Physics Department Atmospheric and Geophysical Sciences Division, University of California, Lawrence Livermore National Laboratory, Livermore, California, Published Jun., 1990, pp. 1–65.

User's Manual, ALOHA™, "Areal Locations of Hazardous Atmospheres", The National Safety Council, Environmental Protection Agency, National Oceanic and Atmospheric Administration, CAMEO™ Technical Support, Published Jun., 1995, pp. 1–213.

International Conference and Workshop on Modeling and Mitigating the Consequences of Accidental Releases Of Hazardous Materials, Sep. 26–29, 1995, Fairmont Hotel, New Orleans, Louisiana, American Institute of Chemical Engineers, pp. 319–330.

HSE Contract Research Report No. 17/1988, "Workbook on the Dispersion of Dense Gases", R.E. Britter, Department of Engineering, University of Cambridge, J. McQuaid, Research and Laboratory Services Division, Health and Safety Executive, Sheffield.

NOAA Technical Memorandum NOS ORCA–65, ALOHA™ (Areal Locations of Hazardous Atmospheres) 5.0 "Theoretical Description", R. Michael Reynolds Seattle, Washington 98115, National Oceanic and Atmospheric Administration, Published Aug., 1992.

CAMEO™ DOS, "Computer–Aided Management of Emergency Operations for IBM®PC™ and Compatible Computers", U.S. Environmental protection Agency, NOAA Hazardous Materials Response Branch, Version 2.0, Published Nov., 1992.

International Conference and Workshop on Modeling and Mitigating the Consequences of Accidental Releases of Hazardous Materials, May 20–24, 1991, New Orleans, Louisiana, Sponsored by Center for Chemical Process Safety of the American Institute of Chemical Engineers, U.S. Environmental Protection Agency, American Meteorological Society, Health & Safety Executive, U.K., pp. 345–368.

"A Workbook of Screening Techniques for Assessing Impacts of Toxic Air Pollutants", TRC Environmental Consultants, Inc., 800 Connecticut Boulevard, East Hartford, CT., EPA Project Officer, Jawad S. Touma, Prepared for U.S. Environmental Protection Agency, Published Sep., 1988.

"A Tiered Modeling Approach for Assessing the Risks due to Sources of Hazardous Air Pollutants", David E. Guinnup, U.S. Environmental Protection Agency, Office of Air Quality Planning and Standards, Published Mar., 1992.

"Guidance on the Application of Refined Dispersion Models for Air Toxics Releases", Source Receptor Analysis Branch, Technical Support Division, Office of Air Quality Planning and Standards, Office of Air and Radiation, U.S. Environmental Protection Agency, Published Mar., 1991.

Choose Chemical

Chemical   UN #   Guide #

AMMONIA, ANHYDROUS

ACETAL 
ACETALDEHYDE
ACETIC ACID, GLACIAL
ACETONE
AMMONIA, ANHYDROUS
BENZENE
BROMINE

| 1 | 2 | 3 | 4 | 5 | 6 | 7 | 8 | 9 | 0 |
|---|---|---|---|---|---|---|---|---|---|
| Q | W | E | R | T | Y | U | I | O | P |
| A | S | D | F | G | H | J | K | L | ← |
| Z | X | C | V | B | N | M | Enter | | |
| Clear | - | | | | | | , | . | |

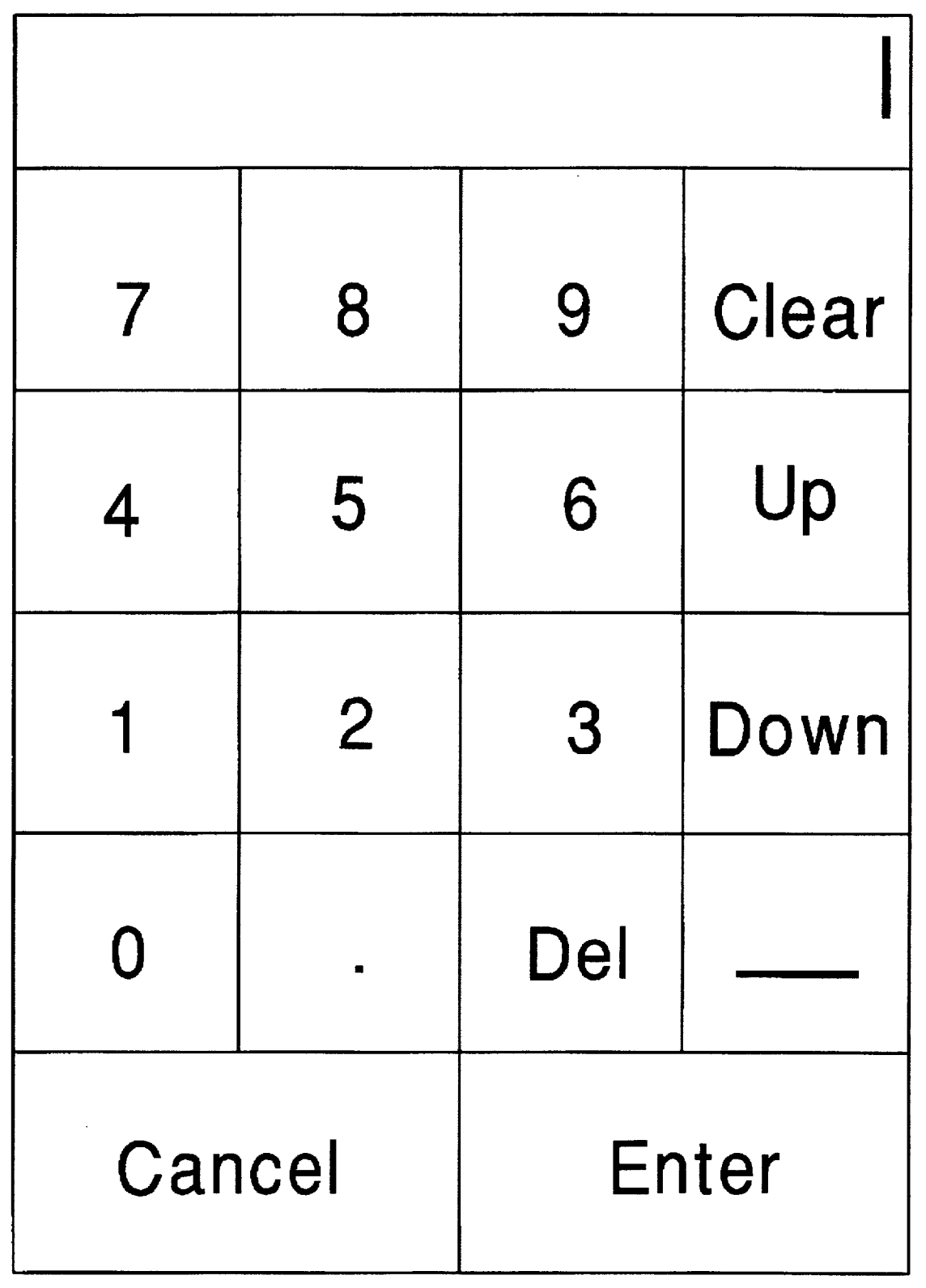

| 7 | 8 | 9 | Clear |
|---|---|---|---|
| 4 | 5 | 6 | Up |
| 1 | 2 | 3 | Down |
| 0 | . | Del | ___ |
| Cancel | | Enter | |

FIG. 2

Options

Date-Time

| 6 | / | 27 | / | 1996 |

| 12 | : | 49 |

○ AM
● PM

Time Zone

MST ▼

Location

City  Cheyenne, WY  ▼

Longitude  104.82

Latitude  41.13

[ Cancel ]　　[ OK ]

FIG. 5

1005 - AMMONIA

Guide 15

Chemical Specific

Colorless poisonous gas, often liquefied

CAS NO: 7664-41-7
Lower Explosion Limit: 16%
Upper Explosion Limit: 25%
Auto Ignition Temp.: 1024 F
Boiling Point: -28 F
Melting Point: -108F
Rel Vapor Density (@68° F): .6
Vapor Pressure (@68° F): 8.5 atm
Specific Gravity: .62
Molecular Weight: 17
IDLH:   300 ppm
TWA:   25 ppm <-Back          Protective Action

FIG. 6

1829 - Sulfur Trioxide

Spill Size

○ Small Spill
  Leaking package of 55 gal or less (drum, jerrican, or box with inner containers) or large package leaking less than 55 gal.

⦿ Large Spill
  Leaking package of more than 55 gal (cargo tank, portable tank, or one-ton cylinder) or leaks from many small packages.

[ <-Back ]  [ Next-> ]

FIG. 7

1005 - AMMONIA, ANHYDROUS

Temperature

[ 73 ] F

Wind Speed

[ 2 ] mph

- ● Light
- ○ Medium
- ○ Strong

Cloud Cover

[ 0 ] %

- ● None
- ○ Partly
- ○ Total

Avg Terrain Ht.

- ● Flat/Water
- ○ Crops/Brush
- ○ Urban/Forest

[ <-Back ]   [ Next-> ]

FIG. 8

1005 - AMMONIA, ANHYDROUS

Source Type
- ● Hole or Pipe Release
- ○ Large Rupture
- ○ BLEVE or Pressure Explosion

Container Type
- ○ Railcar
- ● Trailer
- ○ Portable Tank
- ○ Drum/Barrel
- ○ Cylinder
- ○ Small Pkg Diameter [7.5] ft Length [38] ft % Full by Vol [97] %

Container Orientation
- ● Horizontal          ○ Vertical

[<-Back]          [Next->]

FIG. 9

1005 - AMMONIA, ANHYDROUS

Release Hole Properties

| | | |
|---|---|---|
| Hole Diameter | 2 | inches |
| Hole Height | 0 | feet |

[<-Back]   [Next->]

FIG. 10

1744 - BROMINE

Pool Area—Depth

◉ Circular          ○ Rectangular

Diameter  [ 178 ]  ft

Depth     [ .4 ]   in

[ <-Back ]          [ Next-> ]

FIG. 11

PEAC Program Flow

Options Screen

Enter Chemical, UN#, or Guide # Screen

Specific Chemical Information Screen

Meteorological Conditions Screen

Source Description Screen

Release Hole Properties Screen

Pool Area & Depth Screen

Display Protective Action Zone as Computed by PEAC Screen

Source Size Screen

Display Protective Action Zone from ERG Screen

PORTABLE EMERGENCY ACTION SYSTEM FOR CHEMICAL RELEASES

I. BACKGROUND OF THE INVENTION

Generally, this invention relates to systems and methods of responding to chemical releases. Specifically, this invention focuses upon chemical releases which cause deleterious effects upon human, animal, aquatic, and plant life or property from chemical releases producing toxic, environmental, flammability, explosive, environmental, or other hazards. More specifically, this invention focuses upon hazardous chemical releases which when dispersed in the atmosphere may endanger human and animal life, requiring evacuation of determined safety zones, among others.

Our society is complicated. On one hand, it has been enhanced by technological advancements, especially in the chemical arena. However, these technological advances have not been without cost. As technology has improved, more chemicals have become more complex. They are being processed, manufactured, transported, and stored, and consequently, in some respects, are more dangerous. Some chemicals are extremely hazardous. Other chemicals are mildly harmful and other chemicals benign. Inevitably, in the production, transportation, storage, and use of these chemicals, accidents occur. Some of the accidents occur in inhabited areas endangering human life. Other accidents occur, endangering animal and aquatic life or property.

Some of the chemicals that endanger life are dispersed in plumes. These plumes are caused because the chemical will disperse through the atmosphere. These plumes affect the atmosphere surrounding the accident site. Of course, the plumes can be released for reasons other than an accident.

The severity of the chemical concentrations in the plume can be affected by several factors such as various meteorological conditions. These meteorological conditions can include the time of day, whether it is night or day, wind conditions, temperature, cloud cover, and other conditions. Furthermore, the dispersion plume can be affected by surface conditions surrounding the site. These can include for instance whether the area is an urban area, a mountainous area, a flat terrain, or other factors. Because radiation from the sun is dependent on geographical location, the longitude and latitude can further affect the plume dispersion.

Because some chemicals generate plumes and others do not, it has become necessary for response personnel to be able to quickly identify harmful chemicals, particularly plume generating harmful chemicals, and quickly develop a protective action zone of these chemicals based on various meteorological and physical conditions surrounding the site. This identification of a zone is especially important in urban areas where the immediate evacuation of human life may be very important and yet may be very expensive. For instance, in a large metropolitan area where a chemical could endanger human life, the expense of evacuating a significant portion of the large metropolitan area could be enormous. Thus, response personnel need to be able to (1) develop a rapid predicted response of the harmful chemical to the conditions and (2) have it sufficiently accurate so as not to overburden the unaffected populous by over evacuation due to an inaccurately predicted response.

Likewise, for other types of chemical releases, it is useful to be able to predict a protective action zone. A chemical release for the present invention is meant to include a slow leak, rupture, spill, or immediate liberation such as an explosion or a combination thereof. For instance, in a chemical release of a toxic chemical to aquatic life, it is useful to make a readily available determination of a protective action zone that would identify an area that may be affected. Another example could be an explosive chemical that would cause a pressure wave from an explosion. Similarly, it would be useful to make a readily available determination of a protective action zone that would identify an area that may affect life or property. Thus, for the present invention, a protective action zone is intended to include a zone in which human, animal, aquatic, and plant life or property may be affected from chemical releases producing toxic, flammability, explosive, environmental, or other hazards.

Researchers, scientists, and programers have, prior to the present invention, used essentially two procedures of predicting a response to a chemical release. The first procedure has been to generate actual data, primarily from releases at given conditions. Obviously, the chemical data generated from such releases are limited to those conditions. Whereas predictions could relate to other conditions, this actual data technique is limited to only the actual conditions under which those tests were conducted. Furthermore, because of the harmful effect of various chemicals, it may be prohibitive to test these chemicals from a safety as well as an expense standpoint under urban conditions, for instance, to acquire actual test data. Furthermore, because of the increased technological advances in our society yielding more chemicals, it may become prohibitively expensive to test for all the situations for all the chemicals to obtain actual test data.

A second recognized procedure of predicting a response of a chemical release involves modeling of the actual experimental conditions to predict other outcomes. These models typically are based on theoretical mass transfers, fluid dynamics, and other scientific principles. Models encompassing the state of the art prior to the present invention, tend to use one or more general types of equations that can be sophisticated, typically differential in nature, and require extensive calculations. In some cases, iterative solutions must be sought for simultaneous differential equations. This complexity taxes the ability of even fast processors. The primary goal of these iterative solutions is to produce as accurate a model as possible. In fact, until this invention, the primary focus of many researchers and scientists was to develop a global model or a solution that would account for the vast majority of variables under the vast majority of conditions for most of the chemicals. As computers became more sophisticated and more iterations could be calculated, these researchers and scientists developed further complicated models to use the speed of the new processors in modern computers. However, in attempting to obtain this accuracy, these scientists developed models and systems that were not only complicated to calculate, but complicated to use.

Of the primary models previously used, none appear to be able to satisfy the timely need for first responders that were not extensively trained specialists. First responders typically could be local emergency responders, truck drivers transporting chemicals, law enforcement officials arriving at the scene of a chemical release, or other individuals. These persons may have the greatest need to have a system to determine a protective action zone, and yet may not have the necessary training. Some of the models, because of their complexities, required extensive training; typically several days. In addition to requiring extensive training, these models generally require reference to other materials outside the computer model. For instance, in calculating a response on one model, an atmospheric stability factor is required. This separate determination may require the user to reference extraneous reference books, decide upon an appropriate model as to the stability factor, determine the factor, then input that factor back into the computer response model to continue the calculation of the predicted response. Additionally, these models may use a matrix of differential equations and are solved typically in iterative fashion, requiring extensive processing. On the other hand, some of the models use gross simplifications. For instance, some models attempt to model dense gases as passive gases and even acknowledge that inaccuracies exist for the dense gases at certain concentrations. Thus, the state of the art until the present invention, was to make more complex models utilizing the extreme speed of present day processors for accuracy or to sacrifice accuracy for speed of calculation. This actually developed away from the simplicity and utility of the present invention with its accompanying accuracy. In reaching this complexity, the scientists and researchers may not fully understand the needs of the first responders. First responders may not have at their ready disposal the full chemical library and modeling skills required to generate the required input for the model to then predict a response. In some metropolitan areas, a complete modeling response team has, prior to the present invention, almost required a truck or van with one or two computers and a chemical library with various reference books because of the complexities of the system.

To compensate for this complexity and the lack of availability on various equipment to first responders, many first responders simply gave up on complex computer models and used a book updated and published by the United States Department of Transportation, Canada, and Mexico. The most recent publication is entitled "1996 North American Emergency Response Guidebook" (NAERG). This book is a guidebook for first responders during an initial phase of a harmful materials incident. It contains valuable information. However, because it is so simple, it can lead to gross inaccuracies and predict a much larger (or smaller) response area to the chemical release than what actually may occur leading to the problems of over evacuation and over response at the cost of perhaps tens of thousands of dollars or more, or alternatively result in an insufficient evacuation, possibly causing serious health effects or subjecting populations to harm by such releases.

Thus, to date, the options have been either an over simplified response using the NAERG book or passive gas dispersion models or alternatively, complex modeling techniques, using sophisticated differential equations and requiring high-end computer processors and trained specialists.

In discussing three primary models available today in the market place, a system known as CAMEO™ is one example. It appears to be based on a publication entitled "Technical Guidance for Hazards Analysis—Emergency Planning for Extremely Hazardous Substances," U.S. Environmental Protection Agency, Federal Emergency Management Agency, and U.S. Department of Transportation, December 1987. This publication was an early effort by the EPA to model passive gas dispersion. It supplied tables and may have been regarded as cumbersome and time consuming to use primarily for planning and not for responding. CAMEO appears to be an computer-based version of this book. It appears to use linear equations but oversimplifies the process. For instance, it only calculates using a passive gas dispersion calculation and not dense gas dispersion calculation. A dense gas release is treated as a passive gas release. Passive gas dispersion occurs when a gas has a density less than or equal to that of air. Dense gases are those gases that typically have a greater density than air. Thus, it can be compared to the NAERG book in oversimplicity and level of inaccuracy. Ironically, it tends to be difficult to understand and generally requires specialized training. Furthermore, it appears to have no built-in provision to output a protective action zone when the toxicity of the chemical has been undetermined by the National Institute for Occupational Safety and Health (NIOSH). It simply gives no answer; it requires the user to provide additional input for different levels of concern. Thus, the first responder does not have a predicted response when the toxicity of a chemical is unknown. The first responder is relegated to obtaining a NAERG book and locating a very broad estimate of a protective action zone, having lost precious time. It has other disadvantages as well.

CAMEO and other systems that may be based on passive gas dispersion models may have been useful for some conditions. However, using this methodology leads to discrepancies with dense gas dispersions and especially for more stable conditions. The stability factors and surface roughness (contours of the ground and associated buildings), as known to those in the art, appear to affect the ability of the passive gas dispersion programs to accurately predict a protective action zone and may result in inaccuracies for dense gas dispersions. Thus, the government and industry desired other more accurate models to calculate a protective action zone.

As more complex models were developed, the government, as well as industry to some extent, tended to move away from CAMEO and its prodigy. In part, this may have been because CAMEO did not calculate for a dense gas dispersion as described above. A second model became available in the market place, known as ALOHA™. This model appears to be more advanced than CAMEO and addresses the problem of dense gas dispersions. It does so through complex differential equations. It appears to perform iterative solution calculations using these differential equations in order to calculate for both passive and dense gases. However, it has several limitations. It typically uses a high end computer processor to be effective. Only recently have laptop computers apparently had enough processing speed to even be reasonably available to a response team of technically trained specialists needing portability. As another example of limitations, the plume prediction of a chemical release is limited to approximately ten kilometers. It has no provision for a chemical by the United Nations Number (U.N. No.). So, when a U.N. No. is all that is known, a first responder requires reference to outside and other materials to first determine the chemical and then input the information. It requires relative humidity determination at the site of the release, which may not be a condition generally known to a first responder. Similar to CAMEO, it has no built-in provision to output a protective action zone when the toxicity of the chemical has been undetermined by the National Institute for Occupational Safety and Health (NIOSH). It simply gives no answer; it requires the user to provide additional input for different levels of concern. Furthermore, ALOHA has attempted to run an abbreviated procedure on a high end computer processor and still takes a significant time period on other than a high end processor.

The term iterative manner is intended to mean a result generated as an iterative solution which requires multiple solutions until a certain level of convergence between the solutions occurs, as is known to those in the art. This iterative solution is in contrast to a direct solution. A direct solution typically does not need to process the numbers multiple times to obtain a solution. It simply solves in a direct fashion to obtain an answer. By way of illustration, appendix 1 shows a very simple formula that is solved by an iterative and a direct process. The iterative process in this case requires multiple times to arrive at some level of convergence between the intermediate solutions. On the other hand, the direct approach obtains a solution in a straightforward manner, which could include calculations.

A third well known model in the market place is SLAB, another iterative solution calculation model. It appears to have been developed for denser-than-air-releases at the Lawrence Livermore National Laboratory. Also, it appears to use differential calculation techniques to account for the complexities of dense gas dispersion as well as passive gas dispersion. It was developed before 1988 and has not been recently updated. Apparently, it has no embedded list of chemicals and requires external references, no means of calculating a release rate, and no input for the condition of the container. For instance, to generate an output from SLAB, one generally would need to calculate the release rate of a container separately from the model, then input that data into the model just to determine some of the steps of the calculation. Other information such as atmospheric factors are determined separately for SLAB from other reference books, then input into SLAB to continue the process steps. Furthermore, it produces a dispersion area as a response, but gives no information for first aid or even explosion. Again, this is but an example of a perhaps overly complex model which is intended to be used by trained chemical specialists.

Previously, a response team of people has needed several reference volumes for obtaining the information to input into the complex models. This takes time, it takes training, and it takes expense. Because of the complexities, unless the programs are used consistently, retraining and refresh training are generally required. Sometimes, the trained personnel are unavailable. For instance, in a fire department response team, one or two individuals might be trained and the others might not have the available information. Thus, if that particular trained individual was occupied on some other emergency or release, the other untrained personnel would have little or no ability to make a more accurate prediction other than simply referring to the NAERG book.

Because of these complications, the more complex (and until this invention, the state of the art) models were practically restricted to sophisticated computers. The sophisticated computers decrease the availability to responders, truck drivers, and law enforcement individuals, as well as for instance, military personnel in combat situations. The slower processors, such as in a palmtop computer or even a programmable calculator, which in themselves would be more available to truck dryers and law enforcement individuals and other first responders, would have an extreme difficulty processing these complicated models. One calculation of a protective action zone, for instance, might take 20 minutes on a palmtop computer that might take 6 seconds on a more sophisticated high end processor.

Thus, the more readily available calculators and slower processors are not able to adequately use the present models because of the large complexities developed by the researchers and scientists in trying to obtain accurate information. Yet, the portable palmtop computers and other similar calculating elements are the calculating devices that may be most accessible to first responders and other relevant personnel.

There remains therefore a need to provide portability with simplified input with a minimum of training that would lessen the need or even eliminate the need for other outside reference materials so that a more accurate calculated solution using on-site conditions to determine a protective action zone can be made and still fit into compact areas. These areas could include glove boxes of automobiles, consoles, briefcases, car seats, and other readily accessible areas. This need exists for a diversity of personnel that need to know with some level of accuracy a calculated protective action zone that accounts for some and preferably all the substantially important meteorological and physical conditions of a chemical release with some degree of precision because of the cost of preventing harm. There has been a need for the present invention, while the needed implementing arts and elements have long been available.

While scientists and programmers appreciated that a problem existed, they either relied on complex models and increased training for accuracy or relegated those without training to the broad characterizations of the NAERG book with little adjustment for the actual on-site conditions or even modeling programs such as CAMEO with its oversimplifications, which in some cases still required extensive training.

Even though those with skill in the art made substantial attempts to fill the need of a model, they failed to cope with the real problem because of the failure to understand the root of the problem, that is, of providing a simplified input for a low level processor such as portable palmtop computers or programmable calculators that would rapidly calculate results and yet maintain a degree of accuracy.

Confidential tests with the product has resulted in extreme interest of those who have tested and provided feedback. Their disbelief and incredulity that the particular combination of the present invention could be a viable option has been noticed. Perhaps surprisingly the other systems, models, and approaches taught away from the present systems and methods used in this invention by the emphasis of sophistication in attempting to obtain accuracy.

II. SUMMARY OF THE INVENTION

Accordingly, the present invention provides a calculated protective action zone, such as a safety zone which can be used for evacuation purposes, using simplified input methods and systems and simplified internal calculation methods to model the chemical data. Yet, it uniquely retains a significantly high degree of accuracy corresponding to more expensive, complicated, time consuming state of the art models for the chemical releases, as described above. To accomplish this, the methods and systems of the present invention may use a post processed modeled data base and selected multi-variable equations combined with qualitative and quantitative input and may include default values for various factors. The system may include a small, hand-held electronic calculating element such as a palmtop computer, with extended battery life for portability, although it is equally applicable for high end processors on stationary computers.

Scientists and programmers appreciated that a problem existed. They either relied on more complex models and increased training for accuracy or relegated those without training to the broad characterizations of the NAERG book with little adjustment for the actual on-site conditions. This invention is novel in that it does not seek the supposed sophisticated level of accuracy from complexity that the other models seek. Yet, it still produces a high level of accuracy corresponding to the accuracy of the complex models. Prior to the present invention, no solution appears to have been able to offer the combination of ease of input, computational simplicity, and yet reasonably correspond to the remits of the complex models. Furthermore, the various parameters and inherent randomness in some of the parameters leads to a wide a range of predictability, even in complex models. It appears to be the first to recognize the need of offering a practical solution to avoiding the overly broad sweeping assumptions that the NAERG book and some modeling programs contain, and yet offer the simplicity that a typical user of the NAERG book would favor. It offers more complete predictability than the NAERG book, yet with a similar level of training and ease of input. Furthermore, in contrast to the typical battery available to portable high end processors like laptop computers which may last only hours, the typical battery life using the invention could last as much as days. The present invention makes the calculations even on a low end processor, such as a palmtop computer, in less than a few seconds and yet retains a high level of accuracy compared to the much more complex model that could take as much as 20-30 minutes of calculation on the same palmtop. One aspect of the present invention is that it simulates some of the model data with less sophisticated equations, tables, and other predicted responses. Thus, it still retains a high percentage of correlation with complex models. However, by calculating at a fraction of the time a protective action zone, it can be used on low speed processors and have extended battery life—all with minimal training. Such minimal training can be on the order of approximately one to two hours, or less. Admittedly, the implementing arts were available and the need was recognized for longer battery life and portability. The existing complex models simply were not able to meet those needs. Others taught away from the simplicity and required high end computers with fast processors to do the various iterative, complicated differential and integral calculations. This diversion of purpose and need led to the rethinking of the entire process and resulted in the present invention.

Until the present invention, it was not fully realized that a satisfactory calculated protective action zone could be modeled using a model with simplified input. Additional simplicity was found by not using preselected low effect parameters that would affect the results only to a minor degree. To even further simplify the input, defaults may be provided, if desired. All of this combines to produce a new invention that could satisfy the above goal. This is a large difference from the other efforts in the area. Among other things, simplicity is available for the untrained non-specialist using this invention and yet it provides reasonably predictive results, corresponding to the level of the much more complex models.

Thus, one goal of the present invention is to calculate an electronic representation of a protective action zone using some chemical identifier by an electronic calculating element, such as a palmtop or other computer. A chemical identifier may be any characteristic of a chemical or a group of chemicals that provides an association to appropriate chemical data. The chemical data may include a model or models that may be used to calculate a zone, chemical specific information, flammability, toxicity, or other harmful effects upon a human, animal, aquatic, or plant life or property. The chemical data could include guidelines for responding to general classes of chemicals, distances of isolation or protection, or meteorological conditions and physical parameters used to calculate a zone as well as lookup tables, or any other information that might be useful for the purposes and the intent of the present invention. The present invention may then electronically select at least one type of model of a zone determination from alternative models that are based on the chemical identifier. This model may be used in predicting a protective action zone and outputting the predicted zone. Specifically, one objective of this goal is to pick a type of model from multiple models where each of the multiple models are based upon a chemical identifier which may be unique for each model. Another object is to select these models from a specific set of non differential models, which may be polynomial. Another object is to select the model from a neural network model. Another objective is to select this model from a lookup table. Still another object is to identify a chemical corresponding to the chemical identifier input and determine if that chemical has a toxicity level or associated harmful concentration, then use that input to determine the selection of the type of model particular for the type of chemical. Still another object of the invention is to select mainly the significant effect parameters and other conditions and exclude predicted low effect parameters, which might have minor effects on accuracy. Thus, this step may decrease the calculational time. Still another object is to provide sufficient significant effect parameters so that the results approximate the much more complex models. Still another object is to initially utilize a model to approximate an intermediate predicted response with significant effect parameters for a rapid calculation output for a first responder, then use a more thorough model to generate a more thorough predicted response using at least one additional low effect parameter. One object is to be able to perform the calculation on a palmtop computer. A further object is to perform the calculation using a model that is a rapid calculational model. This model may include the ability to model dense gas dispersion. This model may be at least approximately ten times more rapid than the iterative complex models that heretofore defined the state of the art. Finally, another object is to perform the calculation for a user, typically a first responder, without requiring the user to refer to outside reference materials such as other chemical reference books and materials.

Another goal of the present invention is to utilize a second model with a second goal for predicting a protective action zone of a chemical release that was based or developed from a first model with a first goal. The second model may have the same or similar goal as the first model or could alternatively have a different goal. Specifically, one object of the present invention is to use a first model of a chemical release with a first goal. This first goal could be one of accuracy, whereas the second goal of the second model could be one of operational efficiency. Also, a first goal of the first model could be a correlation to the physical phenomena of actual data, whereas the second goal of the second model could be a rapid calculational time. This rapidity could be based on the second model providing a direct solution. The first model could provide a generally more time consuming iterative solution. Then, in conjunction with accessing a database concerning information related to a selected chemical and using electronic input of at least one meteorological parameter, the second model could calculate a predicted response and output that response. The second model could be stored in an electronic calculating element for calculating a zone. As part of accepting electronic input to calculate a zone, an object could be accepting significant effect parameters as input. Another object could be providing optional qualitative and quantitative categories or optional defaults. Yet another object of the present invention would be able to use as a second model a non-differential model, which could include a polynomial model. The second model could include a neural network model or a lookup table model. The calculations could be performed, as one additional object of the present invention, on a self-contained unit such that the user was not required to directly refer to other reference books and materials. Again, as an additional object, such calculations could be performed on a palmtop computer.

A further goal of the present invention is to provide information on an electronic calculating device such as a palmtop computer, utilize electronically an emergency chemical release model, prompt for optional human sensory input and automated input to simplify the input needed, and use this optional human sensory input and automated input to calculate a protective action zone and produce an output. Specifically, one object of this goal could be to select a model from alternative models. This selection and calculation of a protective action zone could occur, as another object of this goal, so that the user was provided with sufficient information that the user is not required to directly refer to other reference books and materials. As part of the steps of providing optional human sensory input and automated input, another object could be to calculate a zone utilizing significant physical and meteorological parameters and exclude preselected low effect parameters. Such calculations, furthermore, could occur utilizing a rapid calculational model as a further object.

Another goal of the present invention is to electronically accept a chemical identifier as input, utilize a non-differential gas dispersion model based on previously modeled data, determine a predicted response to a gas dispersion by utilizing the non-differential gas dispersion model in an electronic calculation, and output a result. Specifically, one object of this goal of the invention could be to choose a non-differential gas dispersion model from a group of models comprising a cubic model, polynomial model, linear model, quadratic model, polynomial rational model, power law model, and other non-differential models. Such non-differential models could also include neural network models and lookup table models. Similarly, another object could be to provide a self-contained unit to predict a response without the user being required to directly refer to other reference books and materials. Another object of the invention could be to provide the non-differential gas dispersion model from alternative models based upon the selection of the particular chemical or group of chemicals in question. A further object could be to utilize the significant effect physical and meteorological parameters and not utilize preselected low effect parameters in calculating a zone utilizing the non-differential gas dispersion model. Another object of the goal could be to utilize default values for a global location from a database, and default values for time and date entries in making the protective action zone calculation and other default values. Still another object would be to provide a non-differential gas dispersion model that is a rapid calculational model.

Another goal of the present invention is to retain chemical information on an electronic calculating element, accept at least one identifying characteristic of a chemical for identification purposes, and use a rapid calculational model with a low computational complexity for speed of calculation for a dense gas dispersion analysis. This low computational complexity calculation can occur on at least approximately ten times more rapid than the currently available complex models. In part, the invention allows faster calculations by providing a direct solution in the calculations. The complex models may utilize an iterative solution, which typically is more time consuming. By offering a direct solution, the present invention may not need to iteratively solve for a solution. Then, utilizing this rapid calculational model, an object could be to calculate a protective action zone and provide an output. This rapid calculational model could include utilizing significant effect parameters and excluding preselected low effect parameters as one object. This utilization of significant effect parameters could occur in the step of utilizing a rapid calculational model or it could occur in the step of calculating a zone, for instance. This rapid calculational model could include, as an additional object, using a non-differential model which could be polynomial. Alternatively, as an additional object, the rapid calculational model could include utilizing a lookup table or a neural network model. The electronic calculating element could contain alternative rapid calculational models from which the particular rapid calculational model or models could be selected depending on the particular chemical or chemicals identified. A further object of the present invention could include selecting a chemical or chemicals and determining a toxicity level index or other indicia of concentration levels. Furthermore, an object of this goal could be to select between quantitative and qualitative input. Another object of this goal could be to provide a unit such that the user was not required to directly refer to other reference books and materials and to perform such calculations on a palmtop computer.

Naturally, further objects of the invention are disclosed through other areas of the specification and claims.

III. BRIEF DESCRIPTION OF THE DRAWINGS

FIG. 2 shows another exemplary manner of manually inputting information into one preferred embodiment.

FIG. 5 shows one exemplary screen of display options to select a chemical identifier of one preferred embodiment.

FIG. 6 shows one screen displaying information on a specific chemical.

FIG. 7 shows one screen of general input when, for instance, a chemical identifier may not result in a calculation on one preferred embodiment.

FIG. 8 shows one example of input parameters showing qualitative, quantitative, and default values.

FIG. 9 shows another example of additional input parameters regarding source conditions.

FIG. 10 shows another example of additional input parameters of generally human sensory input.

FIG. 11 shows another example of additional input parameters when a chemical may release into a pool of liquid.

DETAILED DESCRIPTION OF THE PREFERRED EMBODIMENT

Figure 1:
FIG. 1 shows one exemplary manner of manually inputting information into one preferred embodiment.
Figure 1:
Figure 1:
Figure 1:
Figure 1:
Figure 3:
FIG. 3 shows one entry screen of one preferred embodiment.
Figure 4:
FIG. 4 shows one initial options screen of one preferred embodiment.

The preferred embodiment was developed to accomplish at least three tasks: (1) combine the useful chemical reference information from a number of different sources for the first responder, (2) provide protection action zones based upon actual on-site conditions, (3) package these into a single unit that is easy and convenient to carry and operate. Information provided may include (1) chemical releases of materials which may include toxicity or other harmful concerns in the atmosphere, on the ground, in water, or underground, and the distances required to provide safety from such effects, (2) distances required to be safe from an explosion or fire, (3) physical data and harmful effects data of specific chemicals, and (4) information on hazard effects and recommended actions to take as a first responder or other personnel to a chemical release. In order to calculate and use the models described in this invention, a certain minimal amount of information is required, which for one embodiment includes particularly the toxicological properties of specific chemicals as determined by NIOSH or other industrial safety organizations. This information may be embedded in the program. For those chemicals, the invention calculates a predicted response. For those chemicals in which there is an insufficient data available from NIOSH, the distances may be taken from the NAERG book, embedded in the program and output for the convenience of a first responder to avoid having to refer to multiple sources.

While the preferred embodiment is described below in primarily toxicological concentration concerns, the present invention, as has already been described, could include a number of harmful effect concerns. Thus, ready substitution and application of the present invention to explosion, environmental, pressure, fire, ecological, and many other levels of concern may be made and is deemed to be within the scope of the methods and systems of the present invention.

The models of the present invention seek to avoid the theoretical complexities that have plagued the researchers and scientists to date. The state of the art, prior to the present invention, seeks to solve multiple differential models by an iterative process, and may take into account most, if not all, of the known parameters. This solution typically is done using a single model or series of equations for different chemical values. In stark contrast, the present invention takes into account not the theoretical complexities, but the set of available data generated by such models for each group of chemicals or specific chemicals. The invention then takes this generated data and solves the data generated by the complex models, using lower order models and relates it to a specific group of chemicals or specific chemicals. For instance, a known chemical may have a specific simplified model associated with it. Each of these resulting models for a preselected set of chemicals may be stored in a database and related to a chemical identifier such as a chemical name or U.N. No. and retrieved upon input of that particular chemical identifier. Therefore, when the computer receives input of some chemical identifier, it cross-links from its memory or other source of the computer database, the chemical identifier and the particular model used for that particular chemical identifier or a group of chemicals. Then, with other input, the invention determines a predicted response, which could be an area of concern, to the chemical release in a much more straight forward and direct manner. Because of this direct linking of various simplified models to a specific chemical identifier, the solutions are much quicker and may be at least approximately ten times more rapid than the prior state of the art theoretical complex models.

Appendix 2 is an example of the vast differences between using state of the art models and the present invention using a 498-66 high end processor. As can be seen, the present invention may calculate a protective action zone on average approximately 250 times more rapid than some of the previous state of the art models, such as SLAB. These state of the art models may include iterative models and may further include dense gas dispersion models. Thus, if a model produced a protective action zone from a 486-66 MHz processor on an average of 5-10 seconds, for the purposes of this application, "rapid" would mean that the present invention could produce a result at least ten times faster and perhaps one hundred times faster. More importantly, for a palmtop computer, such as the CASIO Z7000, having a low end processor, the results could more effectively be compared from approximately 20 minutes for the previous state of the art models such as SLAB to approximately 3-4 seconds for the present invention. Similarly, for ALOHA, which may produce results on an approximate average of 1-2 seconds on the above processor, the present invention may produce results at least ten times faster. Yet, when compared to the results of the more complex models, the calculations from the present invention are often within 10-20 percent of these results. This approach is more than just an alternative academic approach. It may be a factor, apparently not known or used before, to providing a practical solution to calculating a protective action zone using a low level portable electronic calculating element which corresponds closely to the more complex models. Providing such a solution makes readily available to first responders and other relevant personnel a method and system of enhancing their ability to appropriately respond to chemical releases. Additionally, the present invention may model both dense gas and passive gas dispersion. Typically, dense gases are the same or heavier than air and passive gases are lighter than air.

As an example, in one preferred embodiment, to aid in determining the appropriate and various models used in the present invention, the following steps may be included in the process of selection. First, a more complex theoretical model may be used to generate data at various conditions for each selected chemical or set of chemicals. Then, a simplified set of equations, non-differential in form, can be selected. Such equations may be found in reference books and programs as would be known to those in the art. For instance, a computer program known as Table Curve 3D is available from Scientific Software, containing thousands of equations, which is incorporated herein by reference. Using the data generated for each chemical from the complex model, equations from the set of selected equations may be curve fitted to establish coefficients with such techniques as are known to those skilled in the art. A computer program such as the one mentioned above may assist in performing these steps. The results of the curve-fitted equation may then be compared to the data generated by the complex model. More equations from the set may be similarly curve-fitted to the data for each chemical. The best fitting equation from the set may be selected as an appropriate model to use for that chemical, which selection may be based on the level of complexity of the equation and the correspondence to the modeled data. Thus, a post processing of the modeled data from a complex model occurs. One form of equation that appears to be especially useful is of the form $ax^b y^c z^d$, which may be referred to as a power law equation.

In similar fashion, these procedures may be performed for each selected chemical or group of chemicals. These equations may be related to a chemical identifier for each of the selected chemicals. Thus, the computational time and complexity may be reduced and yet a high correspondence to the more complex models can be maintained. These models may then be stored in the chemical database and selectively used with the corresponding chemical identifier. Some or all of the models may be similar or even the same for the various chemicals desired, depending on the chemical characteristics of the chemicals. Thus, a model could be used for a group of chemicals. This determination may depend somewhat on the desired level of correspondence to a more complex model. Obviously, other techniques could be used such as lookup tables for the chemicals or groups of chemicals, neural networks which may mirror self-adjusting corrective problem solving techniques of the human brain, for instance, as is being understood by those skilled in the art, or other techniques for simplifying the generation of data. This simplification appears to have the benefit of allowing low level processors to provide results in a more timely fashion.

Yet another preferred embodiment may offer a high correlation to the modeled data and yet be even simpler than described above. It appears that chemicals react similar to each other regarding protective action zones, relative to the respective molecular weights of the chemicals. Thus, if this correlation is found to be usable and sufficiently accurate, the form of the equation could remain similar and yet be used on multiple chemicals with adjustments in, for example, the coefficients relative to molecular weights. Obviously, other factors could be used. This aspect has at least two considerations. First, it may assist in allowing quicker predictions of a protection action zone in multiple areas of concern, such as toxic, environmental, flammability, explosive, environmental, or other hazards. For instance, many models including the complex ones described above, calculate protective action zones based primarily on just the IDLH. Secondly, this aspect may reduce the number of forms of equations to be stored in a computer database. This could affect the size of the chemical database. Thus, in this preferred embodiment, a protective action zone for a medium weight chemical, such as carbon dioxide, could be predicted using a form of equation and establish a base model. This form might be of the form $ax^b y^c z^d$. Using the generated model for that chemical, other models could be calculated based on the respective molecular weights, perhaps by using the same form of equation as the base model. Furthermore, the models could be varied based on the downwind distance, for example. Thus, for example, with some modification of a base model or some number of base models, variations in the protective action zones for chemicals could be determined by extrapolation based on differences in molecular weights and desired downwind distances. If more flexibility were desired, another input option could allow a user to determine a desired level of exposure to the harmful effect in question, such as a chemical concentration, a flammability, or explosive limit, or other levels of concern. The model could then be used to generate a protective action zone based on this desired level of concern.

There appears to be primarily three sets of parameters that have significant effects on the atmospheric dispersion of a plume generated by a chemical release. These may be used in the present invention. One set of parameters include the characterization of the source including how much material has been released and in what form, such as a vapor or liquid or a combination thereof. The greater the amount of material release, the greater the potential protective action zone is required to provide safety from harmful effects. Likewise, if a leak from a container is at the top, there may be only vapor escaping. On the other hand, if the leak is from the container at the bottom, depending upon the boiling point of the chemical, either a pool may form or vapor may be released and a potential for risk and safety may be more substantial. In some instances, the defining of the source and the magnitude may be difficult or impossible and a worst case scenario may have to be assumed. The invention as shown in the preferred embodiment may be capable of determining a protective action zone rapidly with as much or as little information that may be provided.

A second area of parameters that appear to be important are the current meteorological conditions, which may include the wind speed, ambient temperature, and cloud cover, among others. The dispersion of any vapor cloud typically will be diluted by the surrounding atmosphere. The rate at which the plume is dispersed appears to be dependent upon these meteorological conditions. For instance, lower wind speeds generally mean lower turbulence in mixing and slower dispersion. This aspect may account for part of the concern over the accuracy of modeling dense gas dispersions as passive gas dispersions. The ambient temperature and amount of cloud cover are related to the amount of turbulence associated with a particular set of conditions. If a pool of liquid has been formed, the ambient temperature, latitude and longitude, and amount of cloud cover may play a part in making accurate calculations.

The third set of parameters includes the terrain characteristics, generally referred to as the surface roughness of the area in which the release occurs. For instance, if the terrain is smooth compared to a terrain having a significant number of trees and/or buildings, the vapor cloud dispersion can be altered.

The present invention, through its models, may take into account at least these three categories of parameters which appear to more significantly influence the resulting characteristics and calculated protective action zone. In the preferred embodiment, by limiting the calculations to significant effect parameters, and excluding preselected low effect parameters, the calculations may be simplified, and as a result, performed with increased speed. In some cases, the preferred embodiment provides default values for some of the parameters so that a protection action zone can be obtained even more rapidly. Typically, the default values provide conservative results. However, with additional information that a first responder may have at the site and additional input of such values, more accurate protection action zones may be generated that reflect those particular on-site conditions. Because of the speed of this model or models, in the preferred embodiments, if site conditions change, particularly weather or source release conditions, the revised conditions can be inputted to quickly generate an updated protection action zone. The model the present invention utilizes may be a low computational complexity model as defined in Numerical Methods, Software, and Analysis: IMSL Reference Edition, by John R. Rice, published by McGraw-Hill Publishing in 1983 and is incorporated by reference to the extent not inconsistent with this application. Other materials similarly incorporated by reference include the 1996 NAERG book and Table Curve 3D software described herein.

Other aspects of providing chemical information are incorporated into the preferred embodiment to make the preferred embodiment more versatile and usable in the field to a typical first responder. These other aspects will be described in more detail below.

The screen and steps of the preferred embodiment described below are associated with a CASIO Z7000 palmtop computer. Depending on the platform to be used, the specific screens may differ. However, the general intents and purposes of the present invention could still apply to other platforms. In using the preferred embodiment in an electronic calculating element such as a palmtop computer, manual input can be achieved by either selecting an entry or inputting alphabetical or numerical digits as shown in FIG. 1 or FIG. 2. In this preferred embodiment, the keypad and keyboard are not physically available as would be on a typical desktop computer but are part of a touch screen technology wherein screens, such as shown in FIGS. 1 and 2, are displayed. Another method of input includes the internal structure of the program of the preferred embodiment accepting pre-set values, such as default values.

Indeed, other platforms are available. The screens may change, but the concepts could remain similar to the disclosed systems and methods. A platform that is being considered for the present invention is the Apple Newton™ palmtop computer. While the actual programming may be different, the essential concepts may remain similar to the above described embodiment. Differences would be recognized by one skilled in the art, such as the Newton™ palmtop appears to contain a time and date internal structure and may already contain a location database that other platforms may not contain. Also, the Newton™ palmtop may recognize handwritten letters and symbols, so could have yet another method of inputting values for parameters.

The electronic calculating element can include such items as computers, laptop computers, and portable palmtop computers or calculators, among other devices. Essentially anything that would be able to calculate a zone using other than manual calculations is meant to be incorporated in the term "electronic calculating element."

FIG. 3 shows an initial screen of the present invention in its preferred embodiment. By selecting options, a screen such as FIG. 4 may be shown. In one preferred embodiment, initial settings may be made. These can be the local date and time plus an approximate geographical location which may include latitude and longitude. This could be known or could be determined by the the Global Positioning Satellite (GPS) system, for instance. The location, in conjunction with the current date and time, may be used to compute a sun angle. The sun angle may be used in calculating incident radiation, which may affect evaporation rates, and in making default assumptions regarding meteorological conditions and other input parameters. The information may be stored in the preferred embodiment's memory and may not need to be re-entered unless extenuating circumstances occur such as power loss. Thus, typically, after the input shown in FIG. 4 is entered, a first responder may generally start with FIG. 3 and touch the Begin button of the initial screen.

When a chemical release incident occurs, the first responder may or may not have sufficient information to identify the chemical. In identifying a chemical at facilities, there are usually personnel available or appropriate identification on tanks to ascertain the contents. In general, storage structures are required to be placarded and shipping documents are generally included with shipments. If shipping documents are available or numbered placards are discernable, then there are at least three methods of identifying a chemical, generally by the chemical name or by the UN number. If a specific name or UN number is not known, but a placard is visible, then from the placard type, a Guide Number, known to those in the art, can be associated with the material and general procedures may be employed when responding to a chemical release. Alternatively, a Chemical Abstract Service Number (CAS No.) may be available. For convenience, a placard index may be provided on the inside cover or other close proximity to the preferred embodiment on a palmtop computer to lessen or avoid the need to refer to other reference books or materials. While the preferred embodiment generally uses for identification purposes either the chemical name or UN number, it may incorporate the Guide Number or CAS No. for general information to make the preferred embodiment more usable when the chemical name or UN number is unavailable.

Generally, the preferred embodiment may be designed to allow the user to have a self-contained unit that can allow the user to input information generally known to the user. Typically, the information the user may be able to obtain from his own sensory input is the approximate temperature, wind speed, cloud cover, size of container, and so forth. This human sensory input includes, specifically, being able to access the Guide Number index, the CAS No., by visual or tactile senses and visually or tactically identify placards which may be posted on the side of a tank. Such human sensory input could also include the responder obtaining such common documents as shipping documents that would provide a chemical identifier. For the present invention, human sensory input excludes the requirement of referring to a separate NAERG book or extrinsic computer data reference information in order to operate the preferred embodiment. This simplicity of human sensory input is in contrast to the complex theoretical model, previously considered state of the art, in which the user may require extensive training and other reference books or materials that separately and independently provide information that the theoretical models use in calculating a result. This would include, for instance, separately determining a stability index using a chemical reference book to separately determine a stability model calculation index and then inputting the stability index into the theoretical model for further processing. The preferred embodiment for the present invention does not require such extrinsic reference books or materials.

Figure 5:
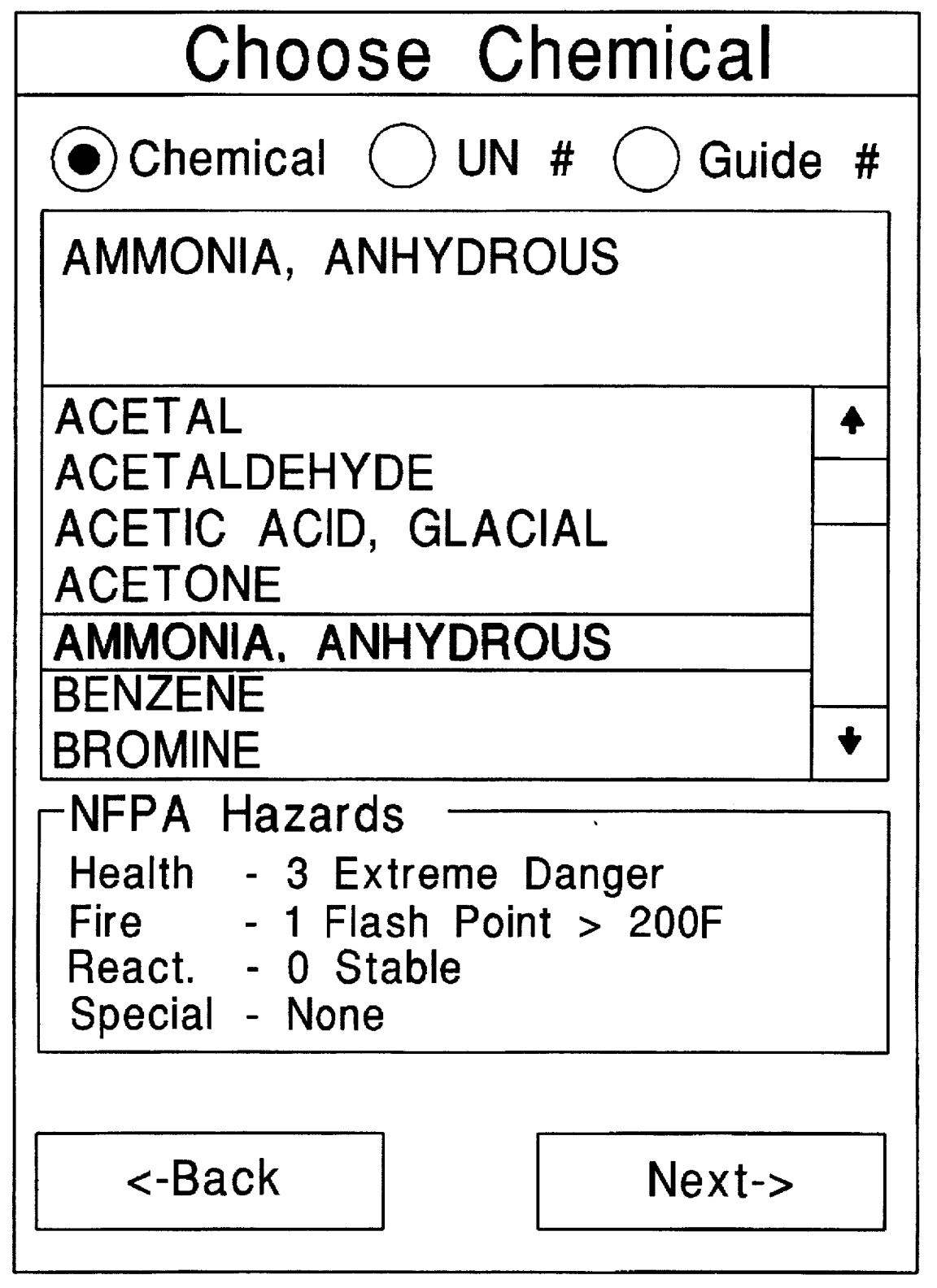

In the preferred embodiment, upon selecting either a chemical or a U.N. No. as shown in FIG. 5, the preferred embodiment may contain a list of available categories of information for the particular chemical identifier. The list of available categories may include chemical specific information, health hazards, fire explosion, emergency action, fire information, spill or leakage information, first aid, and supplemental information, shown in FIG. 16. Obviously, it could include more information or less information. For instance, this collection of information may be stored in a memory on the palmtop computer in a database. The preferred embodiment may use the contained memory of the electronic calculating element; alternatively, it is not just restricted to the contained memory. For instance, it could include a CD ROM, removable disks, removable magnetic card, and could include remote databases connected by on-line or microwave transmission, or other available information. In the preferred embodiment, a key aspect, however, is that the user be able to take these units into the field and be able to determine, using the on-site conditions, a protective action zone. Typically, the computer's memory will store a sufficient database used in making the calculations and providing other information.

If a user chooses chemical-specific information, the preferred embodiment may display a screen similar to FIG. 6 and may include among other things the Immediate Danger to Life and Health (IDLH) category established by NIOSH. The IDLH may be used in the calculational steps of the model for determining a protective action zone. Obviously, other levels of concern (LOC) could be used such as a NIOSH recommended exposure limit (REL), a threshold limit value (TLV), a lower explosive limit (LEL), flammability indexes, pressure indexes, solubility indexes, or other categories as input for the models. The input element typically would be connected to an electronic calculating element. This could include for instance a physical connection such as on a palmtop computer by pressing a touch screen, a keyboard or keypad on a desktop computer. It could also include other input elements or devices such as microwave reception, touch screens, voice or handwriting recognition, infrared, or other remote or non-physical connections or other selective criteria. The inputting element may also include internal input from a module or aspect of the computer program that would recognize a default value. One key aspect is the input may be associated with the calculating element.

If the available or published information is insufficient in order to allow the preferred embodiment to calculate a predicted response, the preferred embodiment can selectively and intelligently display an alternative screen such as shown in FIG. 7. That screen generally prompts for broad characteristics such as small spill and large spill. Typically, the current date and time are important and are a part of the internal memory structure of the preferred embodiment, thus no other manual input may be required for those parameters.

If sufficient information is available on the particular chemical in question, then the preferred embodiment may calculate a protective action zone based upon on-site specific conditions. Relevant parameters may include ambient temperature, wind speed, cloud cover, and average terrain height. Such information is shown in one screen, for example, in FIG. 8. The ambient temperature may be given a default value of 73° F. If the default value is inappropriate, it can be changed to the appropriate temperature. In some cases, the first responder may guess from his sensory input an appropriate temperature. The wind speed in the preferred embodiment may have three default entries: light, medium, and strong. Obviously, other indicia could be designed. Alternatively, and in addition to these qualitative values, quantitative numeric values can serve as input. For instance, if the wind speed is known or the first responder had a sense the wind speed was different, then the responder could enter a numerical quantity. Thus, the first responder has a choice between a quantitative and qualitative response. Likewise, the cloud cover may provide default entries such as no cloud cover, part cloud cover, or total cloud cover. Alternatively, the first responder may enter a specific numerical quantity. A fourth parameter used for the preferred embodiment provides three choices: flat/water, crop/brush, or urban/forest. Thus, for simplicity, the average terrain height may provide only qualitative input. Obviously, quantitative input could be provided as well.

Having selected four basic specific meteorological and terrain parameters, the next step in the preferred embodiment may be to select physical related parameters, which may include container information. For simplicity, the present invention separates this area of information into three categories, including source type, container type, and orientation of the container, as shown in FIG. 9. To define the source type, there are three sources including pipe or hole release, large rupture, and BLEVE (boiling liquid expanding vapor explosion) or pressure explosion. For instance, a pipe or hole release may be a typical type of source where there is a major failure of the container. This choice may be used as a default for the preferred invention. The other two choices in the preferred invention, a large rupture and BLEVE or pressure explosion, are similar in appearance but can make differences in the calculation of the protective action zone. For instance, a large rupture may be used to describe a condition by some external force that has mechanically breached a container, causing its contents to escape to the surrounding environment. This is in contrast to a BLEVE or pressure explosion where a container has been ruptured due to an internal force that has caused the contents to exceed the bursting pressure of the container, causing the contents to affect the surrounding environment. A primary difference in the calculations made in these two cases may be the assumption of the temperature of the contents and therefore, whether the material is a liquid or vapor as it is released. For instance, if a large rupture has been selected, then another screen may be provided to prompt input about a liquid pool that may have formed if the specified material has a boiling point significantly above the ambient temperature.

Regarding a container type, the user may be provided with six choices, as one example in the preferred embodiment. These may include a railroad car, trailer, portable tank, drum/barrel, cylinder, and small package. This information may be used to calculate the amount of material that has been spilled if a failure of a tank has occurred when a major rupture or BLEVE has been indicated and how much material may be released over some time period if a pipe or hole release has been selected. Obviously, it could be used for other factors as well. When a specific container type has been selected, the preferred embodiment may provide default values for the container for length and percentage full by volume. These values may be provided with typical dimensions. If the user decides to modify a dimension or the filling volume of the container, then a desired entry box for quantitative information may be changed through the user's input. Because in many instances the percent of volume may not be known by the first responder, the preferred embodiment may assume a maximum filling density for most containers as a default. This assumption might provide the worst case scenario for a protective action zone.

Finally, in the screen shown in FIG. 9, the horizontal or vertical orientation of the tank is requested. This input may allow the preferred embodiment to calculate either a vapor or liquid flow rate from the breeched container.

Depending on the specific chemical selected (and its boiling point in relation to its ambient temperature) and the source type specified, the preferred embodiment may determine if there is a potential for liquid being released from the container. Potentially, one of two screens may appear as shown in FIGS. 10 and 11. These screens request additional information to assist in making calculations. If a specific chemical's boiling point is significantly below ambient temperature, it may be treated as a cryogenic material which is assumed to transform to a vapor/aerosol/gaseous mixture upon release. Therefore, the size of the hole and its location above the bottom of the tank may be requested as in FIG. 10. With this information, the preferred embodiment may calculate a release rate to determine a source strength. Preferably, the user need not make such a calculation external to the preferred embodiment's unit. Default values may also be provided. Alternatively, if a specific chemical's boiling point is near or significantly above the ambient temperature, then an assumption may be made that the material will not flash to a vapor/aerosol/gaseous mixture, but may form a liquid pool of some dimensions. Thus, the screen shown in FIG. 11 may be used. Two general configurations for a pool may be available, that is, a circular or a rectangular shape. Again, default values may be provided as well as quantitative and qualitative input.

Thus, with a few parameters of general human sensory input that could be determined by the average user, a very complex calculation by the preferred embodiment may be performed, using the model described in the present invention. This may not even require significant training to accomplish.

Figure 12:
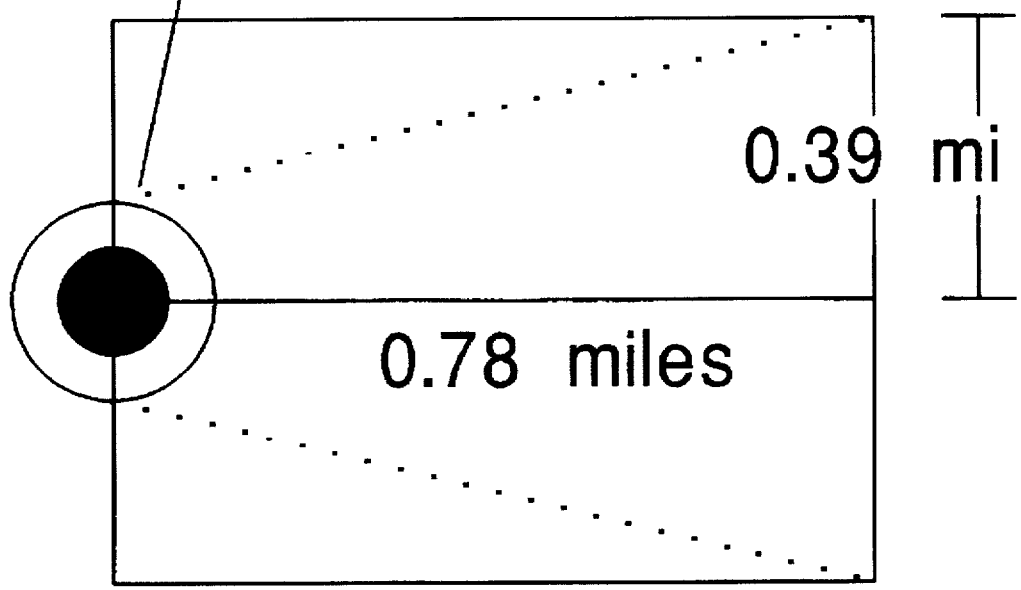
FIG. 12 shows one example of an output of the preferred embodiment containing an initial isolation zone and a protective action zone.

FIG. 12 shows the results of the calculation using the input described above. First, an initial isolation zone may be provided. These values may be derived from the NAERG. The protective action zone may be the result using the calculated values using one of the models of the present invention. Using complex state of the art theoretical models on an electronic calculating element such as a palmtop computer may take a calculational time of approximately 20 minutes. In contrast, using the models of the present invention of the embodiment on, for example, a palmtop computer, the calculational time may be on the order of approximately 3-4 seconds. As the present invention perhaps surprisingly demonstrates, the accuracy of the present invention may be similar to the accuracy of the complex, theoretical models.

As mentioned above and as discussed regarding FIG. 7, at times the NIOSH has not determined various chemical toxicity levels that are preferably used to calculate a protective action zone. In such instances, based upon the selection shown in FIG. 7, and when no calculations may be done by the present invention (or by the other state of the art models described above), an output similar to FIG. 12 may be shown, which may be derived from the information in the NAERG book. The NAERG distances may be used in these limited cases when there is insufficient data available in a database to make the particular calculations. Thus, while the model may not calculate in these particular instances a protective action zone, the preferred embodiment includes the information in order to include a single and easily available source for a protective action zone to the first responder. This is in contrast to the previously described theoretical models where no protective action zone is provided if they are unable to calculate the results.

The above discussion of the preferred embodiment essentially describes the methods of use as well as different characteristics of the invention. More specifically, the present invention uses a model or models to be able to calculate the predicted response such as a protective action zone. Obviously, the invention is versatile and could be used to predict other responses besides protective action zones.

Figure 13:
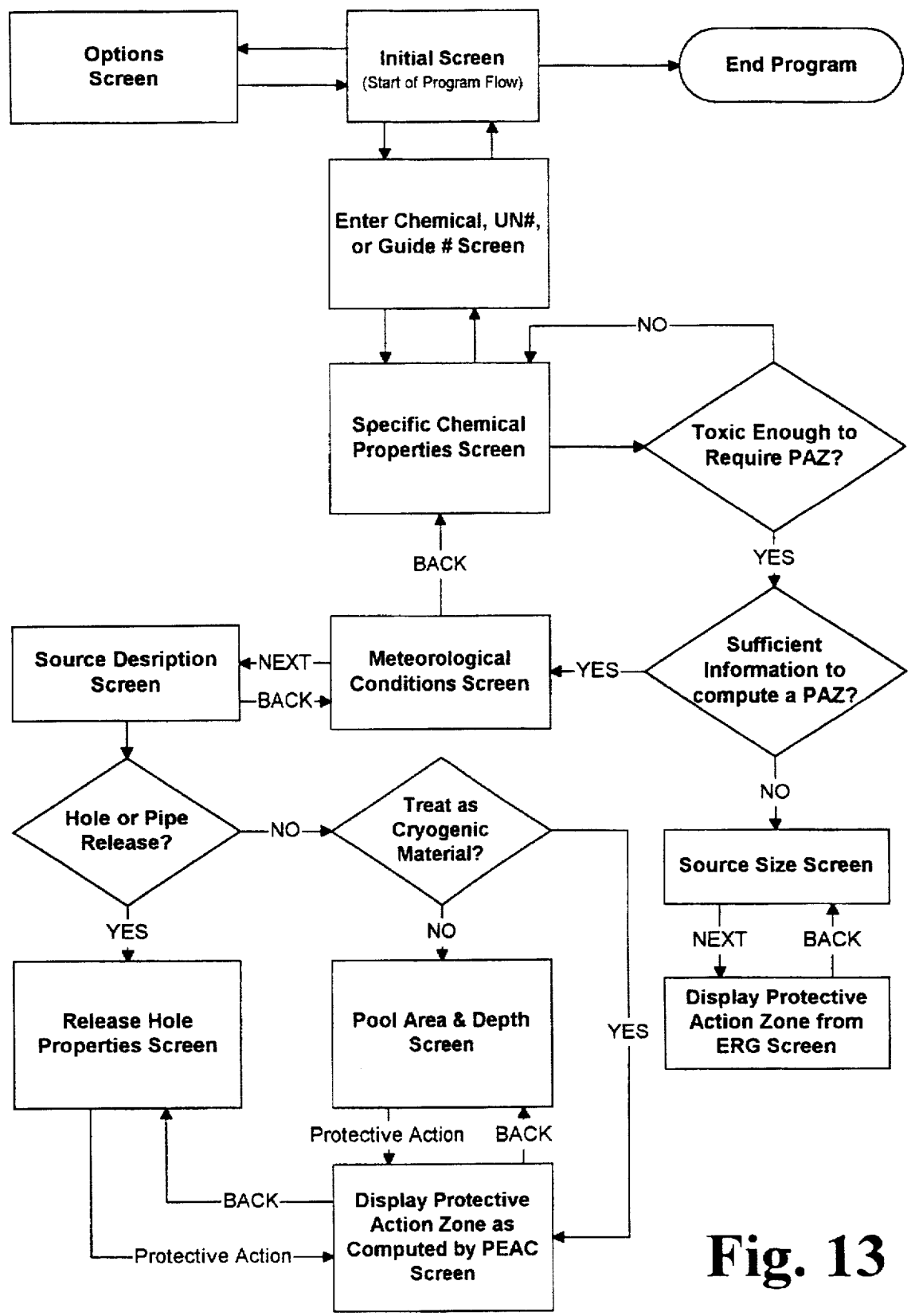
FIG. 13 is a general flowchart showing the overall program flow of one preferred embodiment.
Figure 14:
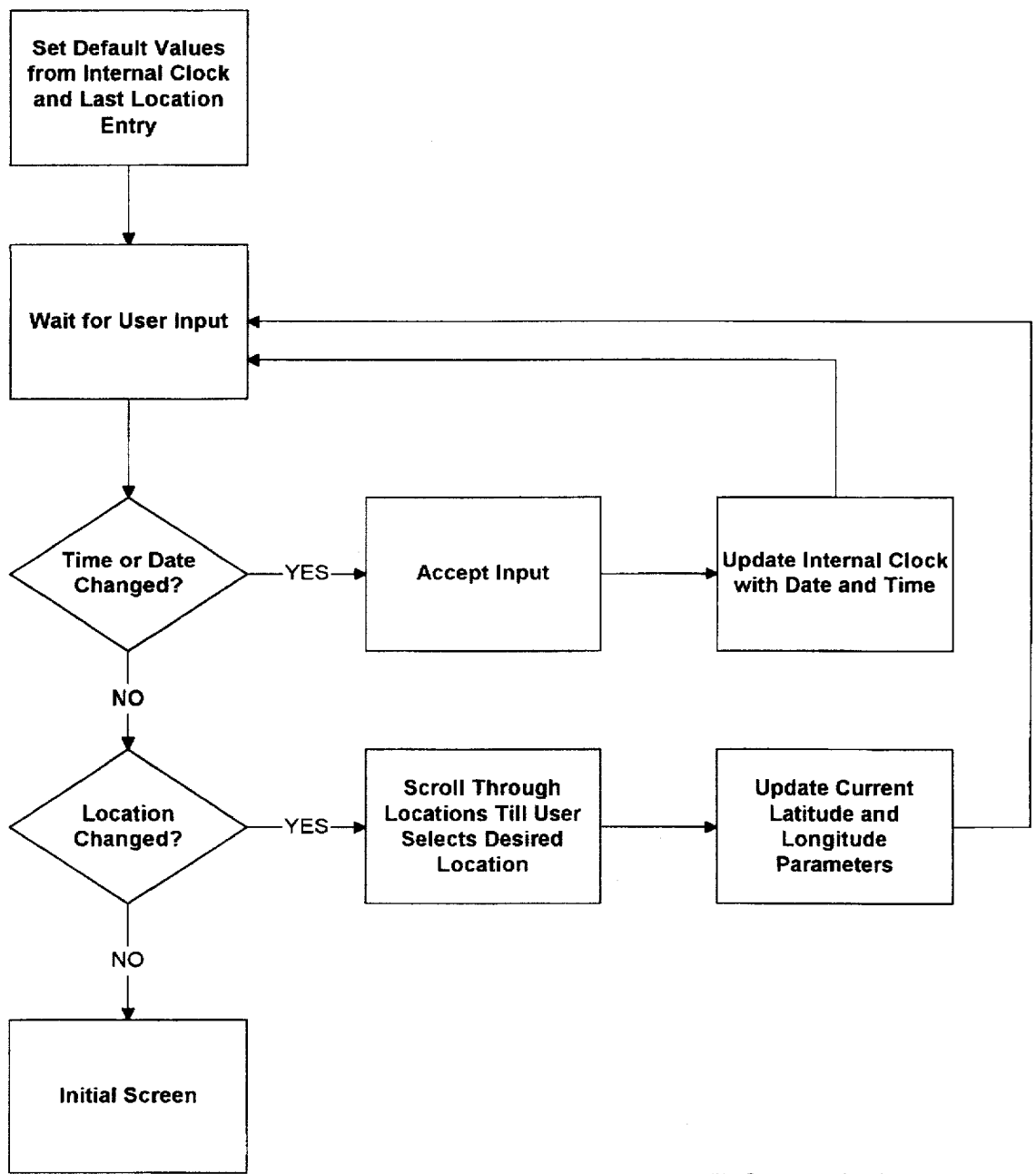
FIG. 14 shows a flowchart of one embodiment of entering preliminary information such as time, date, and location.
Figure 15:
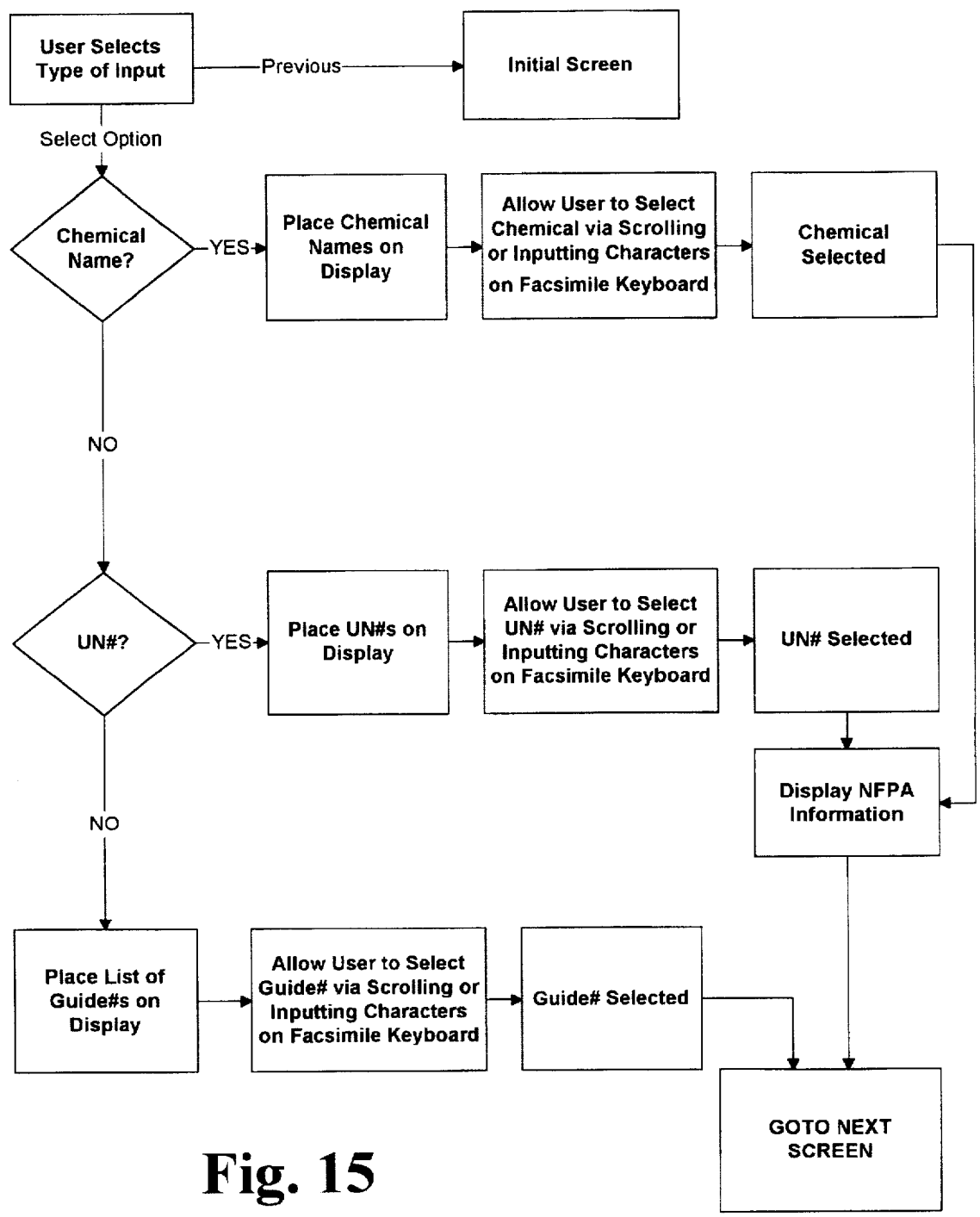
FIG. 15 shows a flowchart utilizing various requested input information of a chemical identifier.
Figure 16:
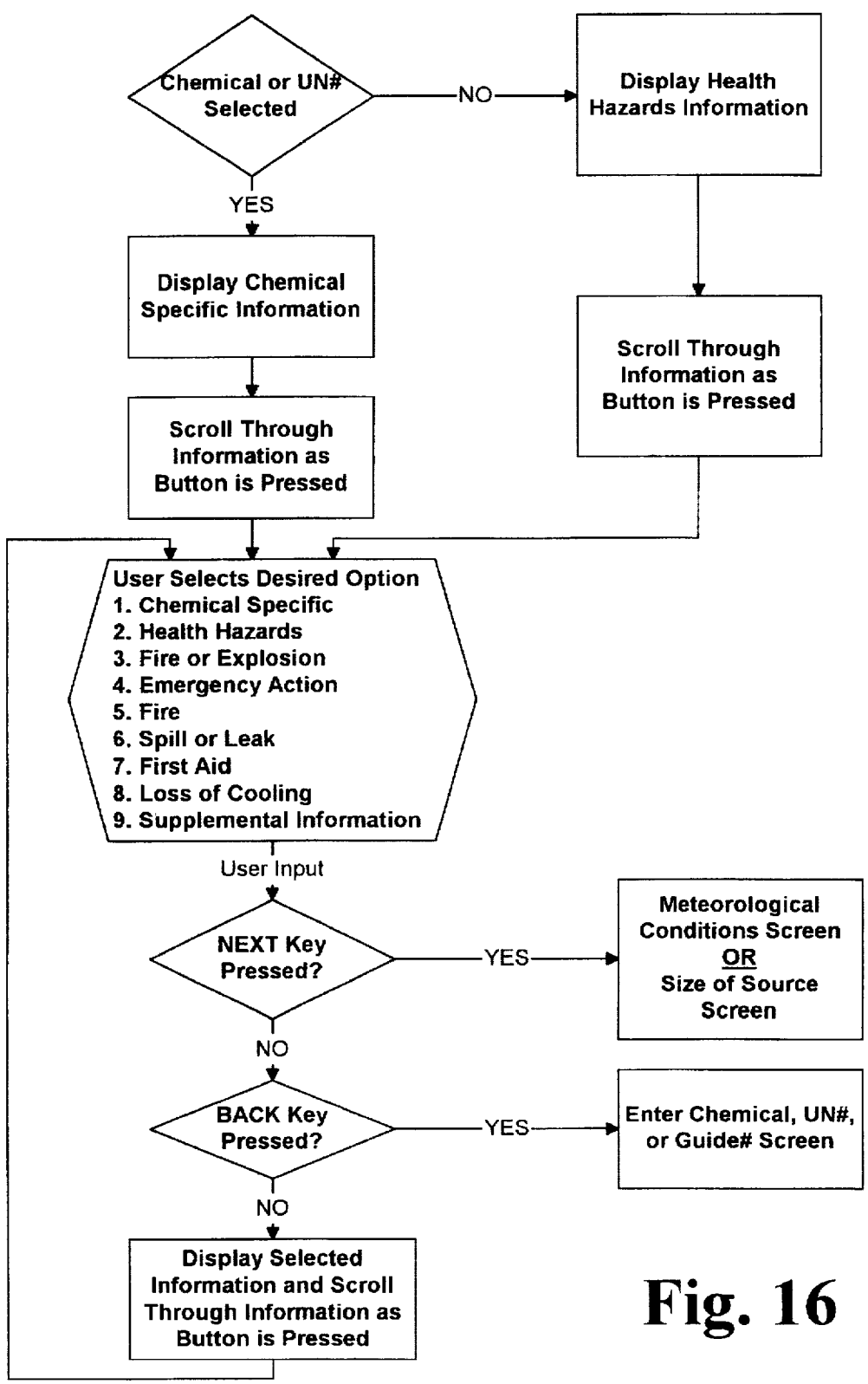
FIG. 16 shows a flowchart relating to various information available in a chemical database.
Figure 17:
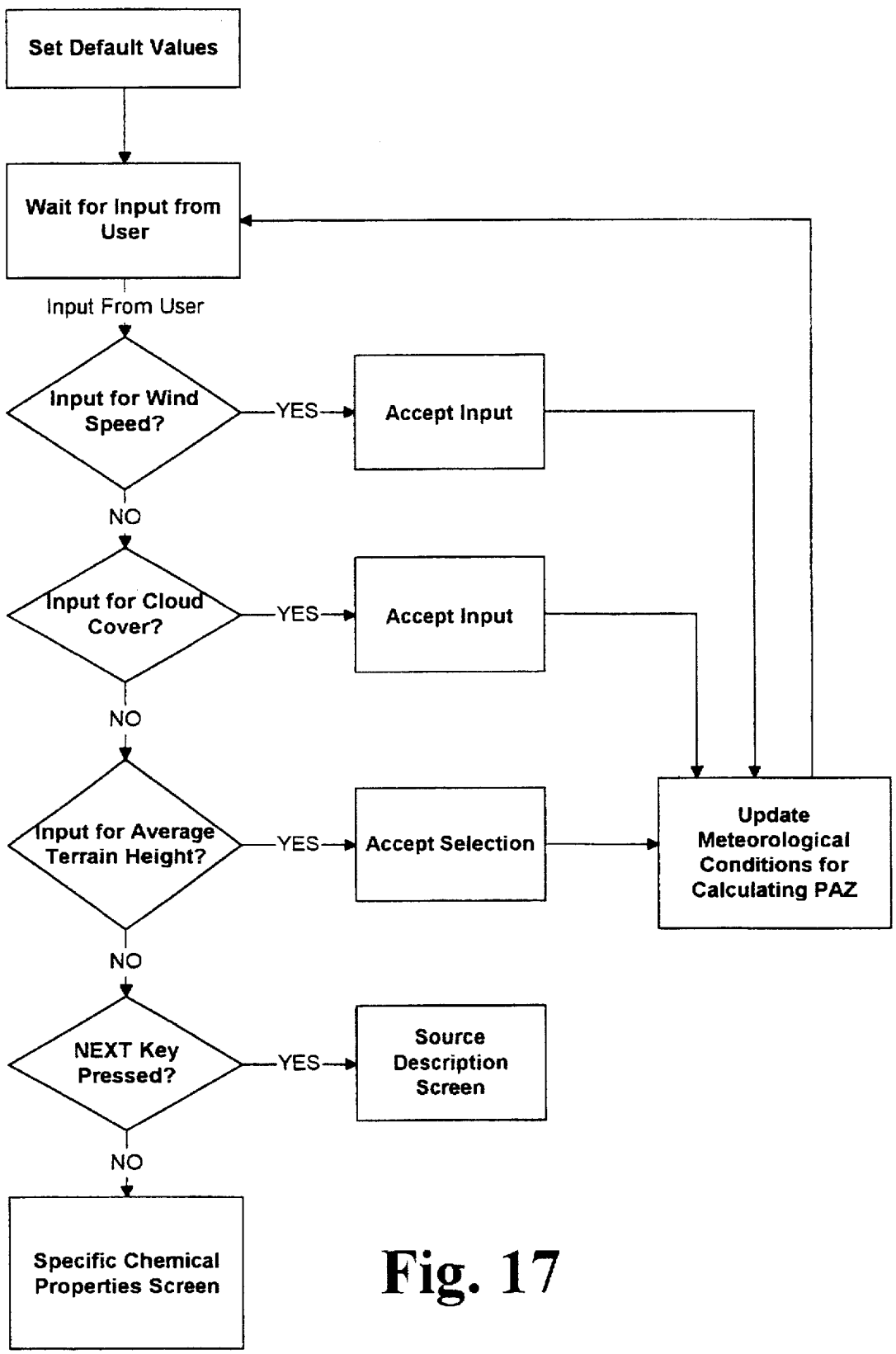
FIG. 17 shows a meteorological conditions flowchart.
Figure 18:
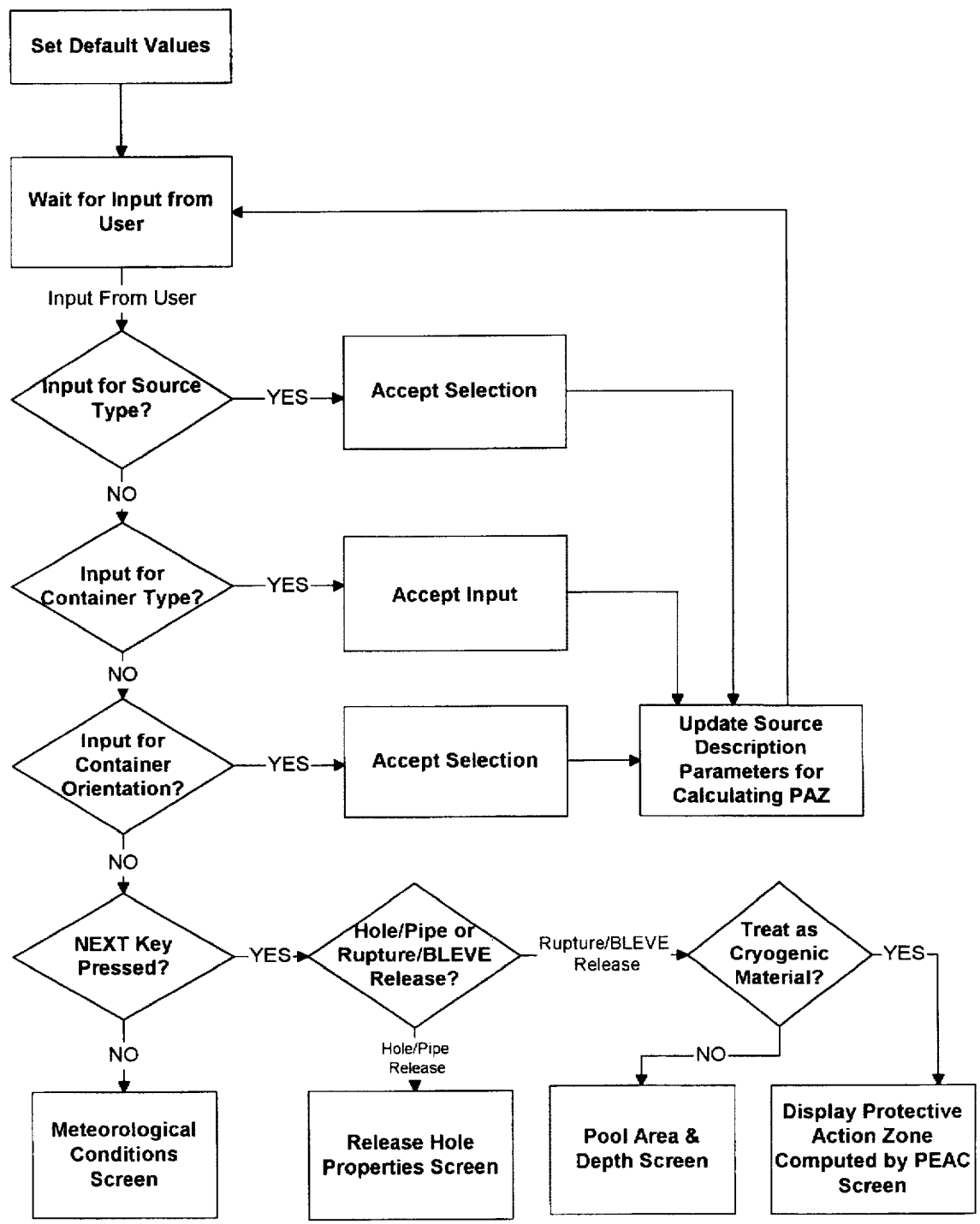
FIG. 18 shows a flowchart having additional input regarding the source of the chemical release.
Figure 19:
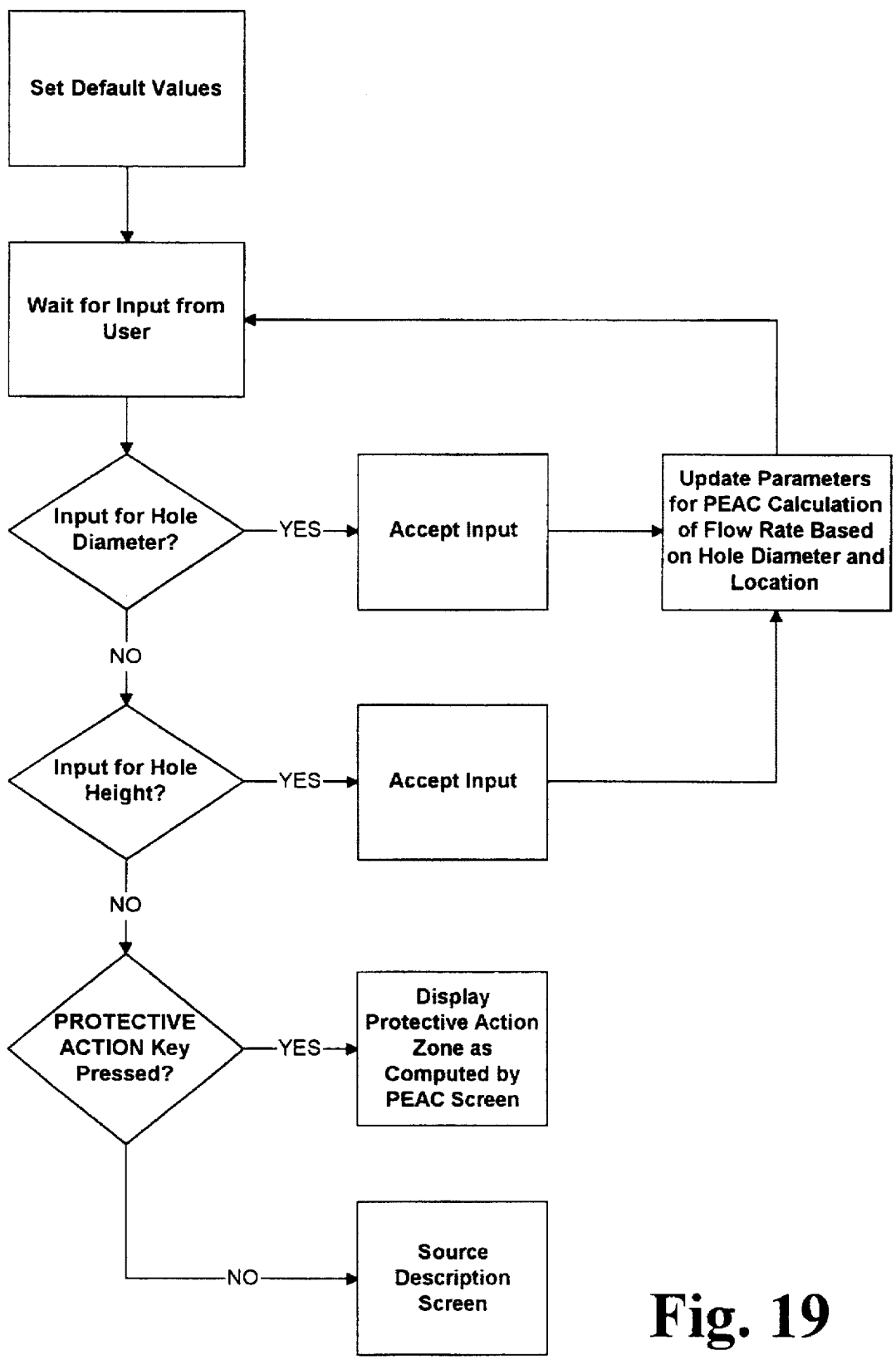
FIG. 19 shows a flowchart of the program regarding release hole properties.
Figure 20:
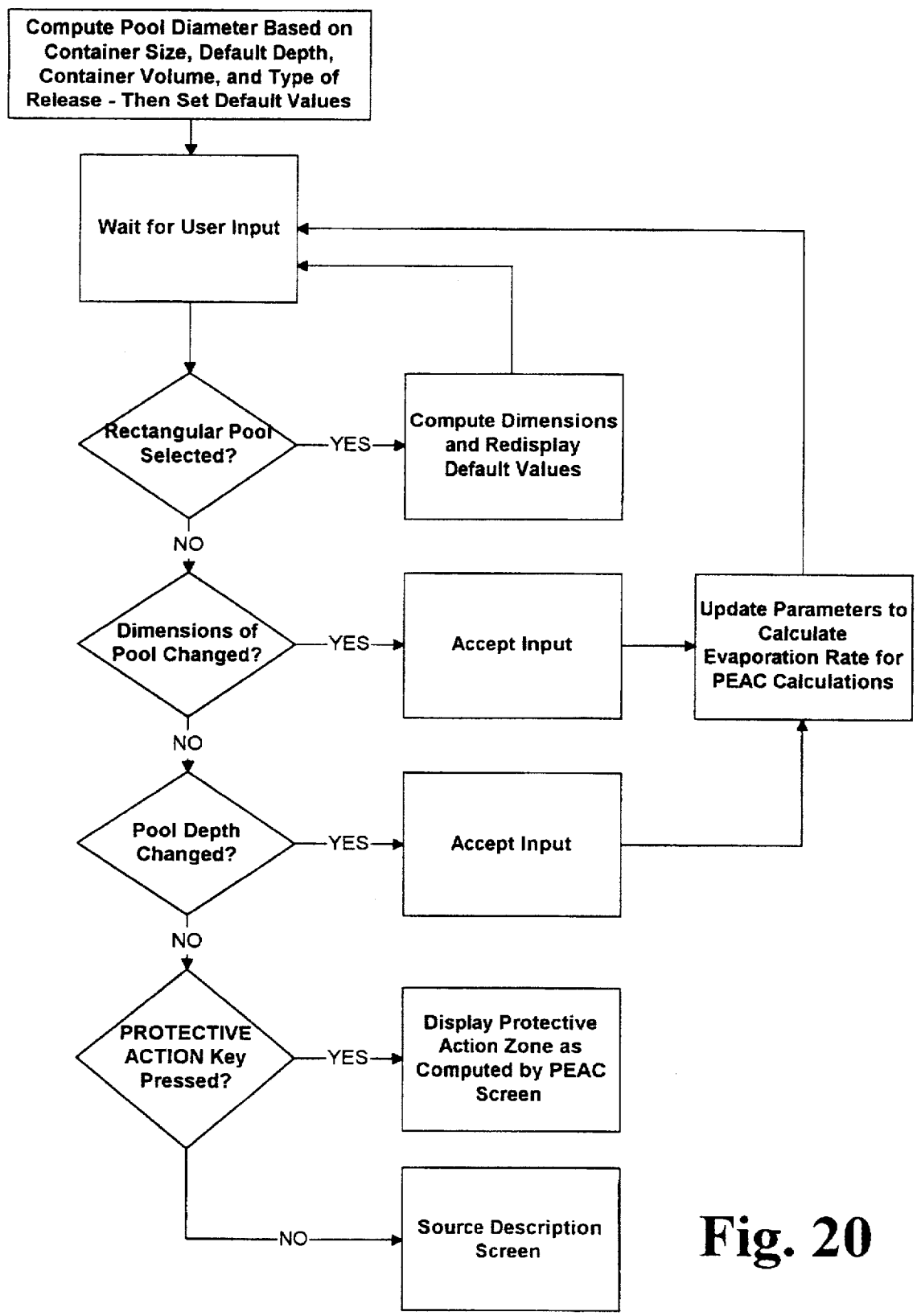
FIG. 20 shows a flowchart of the program regarding a pool area and depth.
Figure 21:
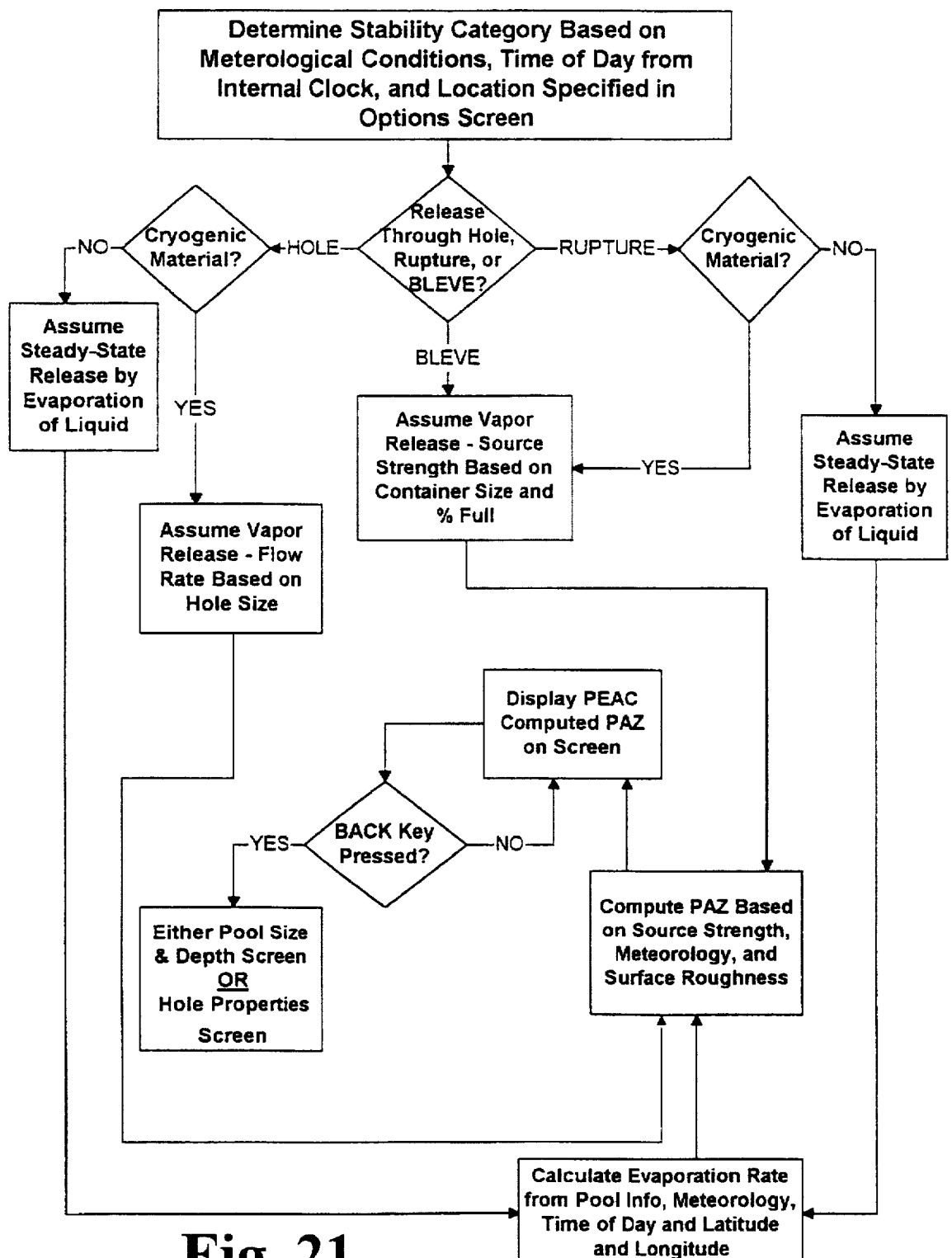
FIG. 21 shows a flowchart utilizing some of the input and logic used to calculate a protective action zone.
Figure 22:
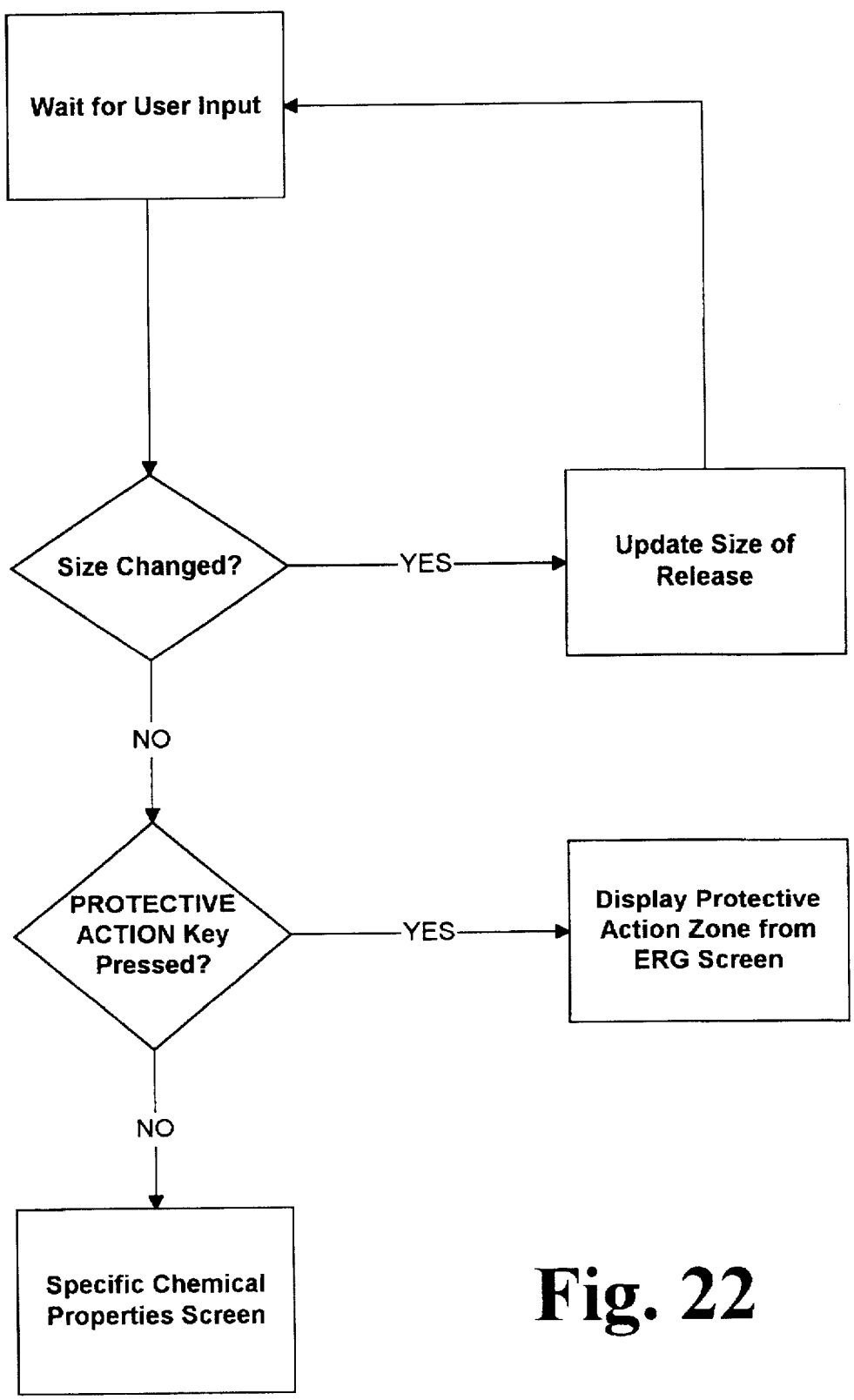
FIG. 22 shows a flowchart of alternative input when the program does not calculate the protective action zone.
Figure 23:
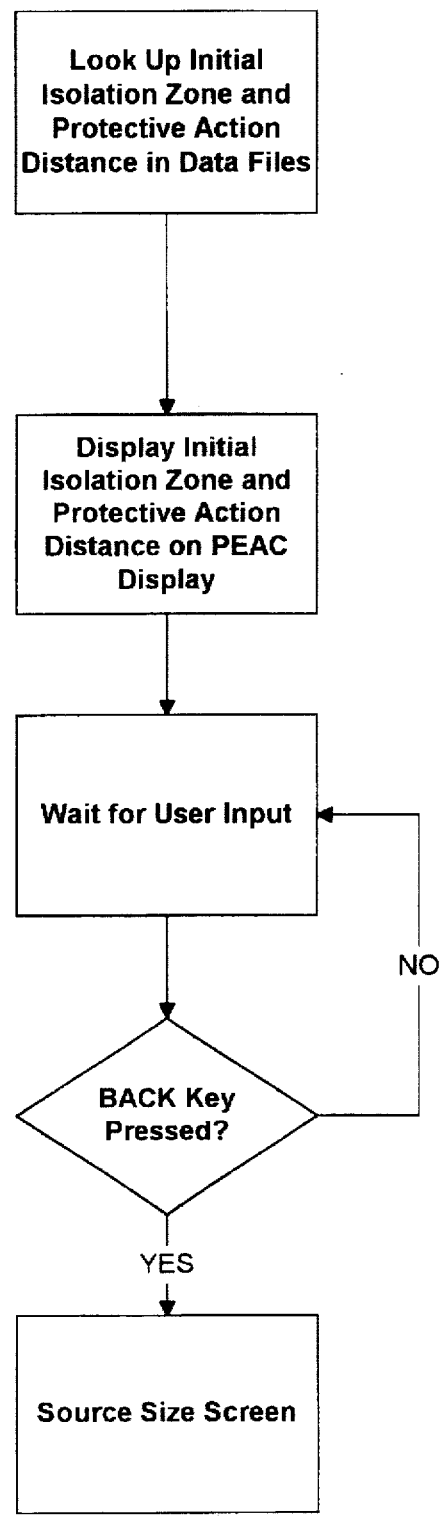
FIG. 23 is a flowchart of a display for the non-calculated results.

FIGS. 13-23 show schematics of the program logic in one preferred embodiment. Obviously, other program logic is possible to accomplish the goals, objects, and intents of the invention. FIG. 13 is a general schematic showing the overall program flow. FIG. 14 shows one embodiment of entering preliminary information such as time, date, and location. FIG. 15 shows various requested input information depending on the known chemical name, UN No., or even just a Guide Number. FIG. 16 shows various information that may be obtained from a chemical database regarding the general characteristics of the chemical. FIG. 17 shows a meteorological conditions screen useful for inputting information regarding the such parameters as wind speed, cloud cover, and terrain height. FIG. 18 shows additional input regarding the source of the chemical release, useful for calculating the protective action zone (PAZ). FIG. 19 shows a schematic of the program regarding release hole properties depending on the nature of a release. FIG. 20 shows a schematic of the program regarding a pool area and depth if the release is considered a pooling release such as a cryogenic material. FIG. 21 shows some of the input and logic used to calculate a PAZ. FIG. 22 shows an alternative screen used to request input when the program does not calculate the PAZ and FIG. 23 is a display screen for the non calculated results.

Figure 24:
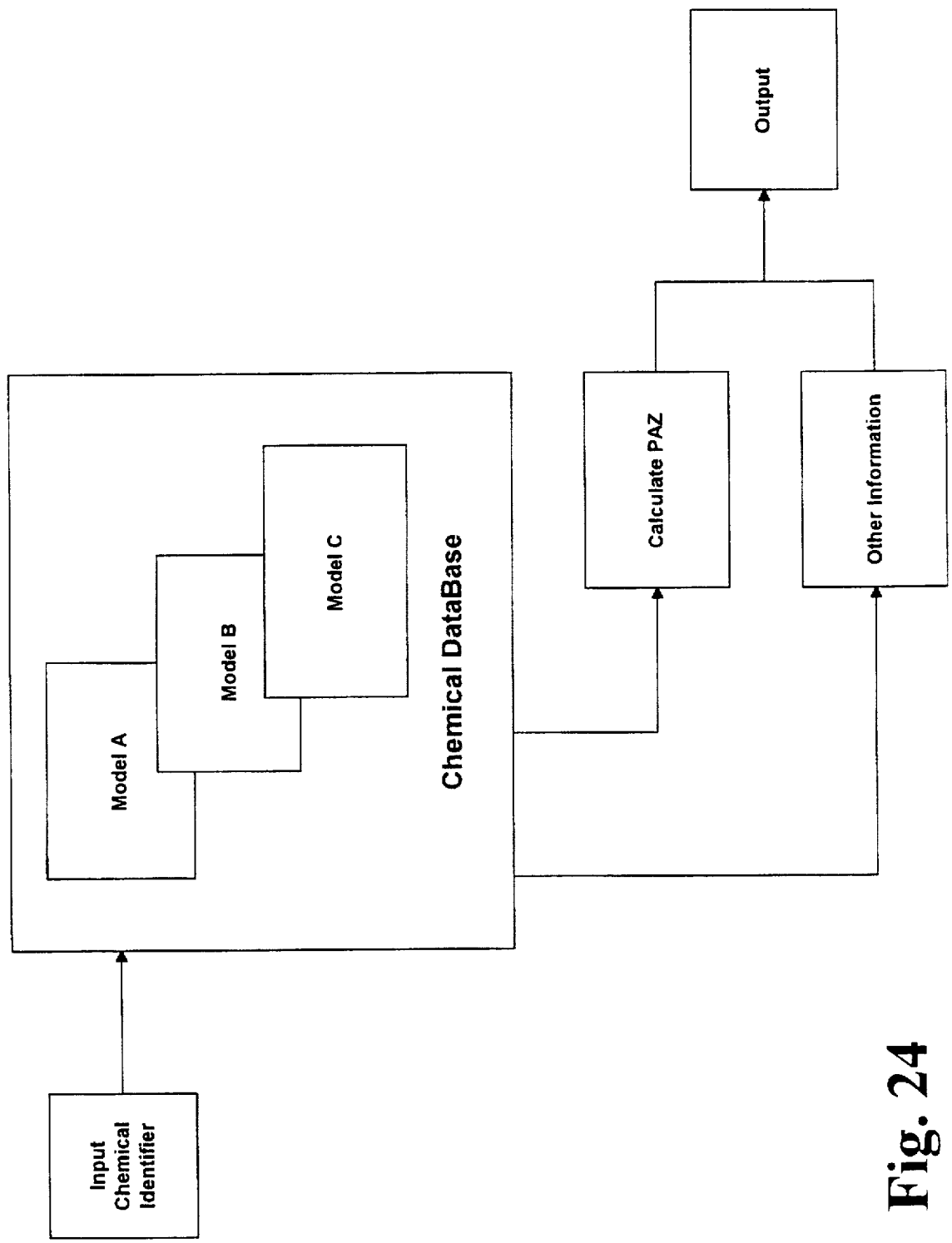
FIG. 24 shows a block diagram of at least one aspect of the present invention of selecting a model from a set of models associated with a chemical identifier for a chemical or group of chemicals.

In more detail of the models, and in reference to the claims, one aspect of the invention is shown in FIG. 24 as a flow chart. A user may input a chemical identifier such as a U.N. number, CAS No., or a chemical name or even a more general Guide Number. In some instances, such as at a specific plant or facility where a specific chemical is found, the invention could be set to default to a specific chemical or chemical identifier and thus may not require such input by a user. Other instances could reduce the need or the desirability of normally inputting a chemical identifier. However, generally, users may prefer to manually input such chemical identifiers through a memory device connected to the electronic calculating element (which could be internal or external such as an updatable removable memory similar to a magnetic card, or some remote access) to associate a chemical identifier to a chemical database. The chemical database may contain the information described above such as toxicity levels, fire control, fire hazards, emergency actions, first aid, and so forth. Likewise, the chemical database could contain a set of models that are related to either the specific chemical through the chemical identifier or a family of chemicals, as is appropriate. Thus, the chemical database could include multiple models by which a chemical identifier could be used to select a particular model to be used for that particular chemical or family of chemicals. The models may include, for instance, lookup tables. The models may also include non-differential polynomial models, neural network models, cubic models, quadratic models, polynomial rational models, linear models, power law models, and so forth. The models could be non-differential. In addition to being non-differential, a model could include a single or even double differential equation such that the complexity might be increased somewhat yet below the level of the state of the art models where as many as seven differential equations are typically solved simultaneously. Generally, these models may relate to a gas dispersion analysis and may include both dense and passive chemical releases.

In inputting the chemical identifier, the chemical database and electronic calculating element could retrieve a particular model designed for the particular chemical identifier. The input described above could be used in the particular identified model to calculate the protective action zone. This particular model could include the significant effect parameters, and for simplicity and speed, exclude preselected low effect parameters. By excluding preselected low effect parameters, computational speed may be increased and therefore computational time decreased because of the conscious decision to exclude some or all of the low effect parameters which may have little effect upon the end result of a predicted protective action zone or other response. Once the calculation is performed, the first responder may need an output. As shown in the preferred embodiment above in FIG. 12, the output may be a visual output such as a display. Naturally, it could be any output that the first responder could find useful. This could include, for instance, visual, tactile, and audible output, as well as others.

Figure 25:
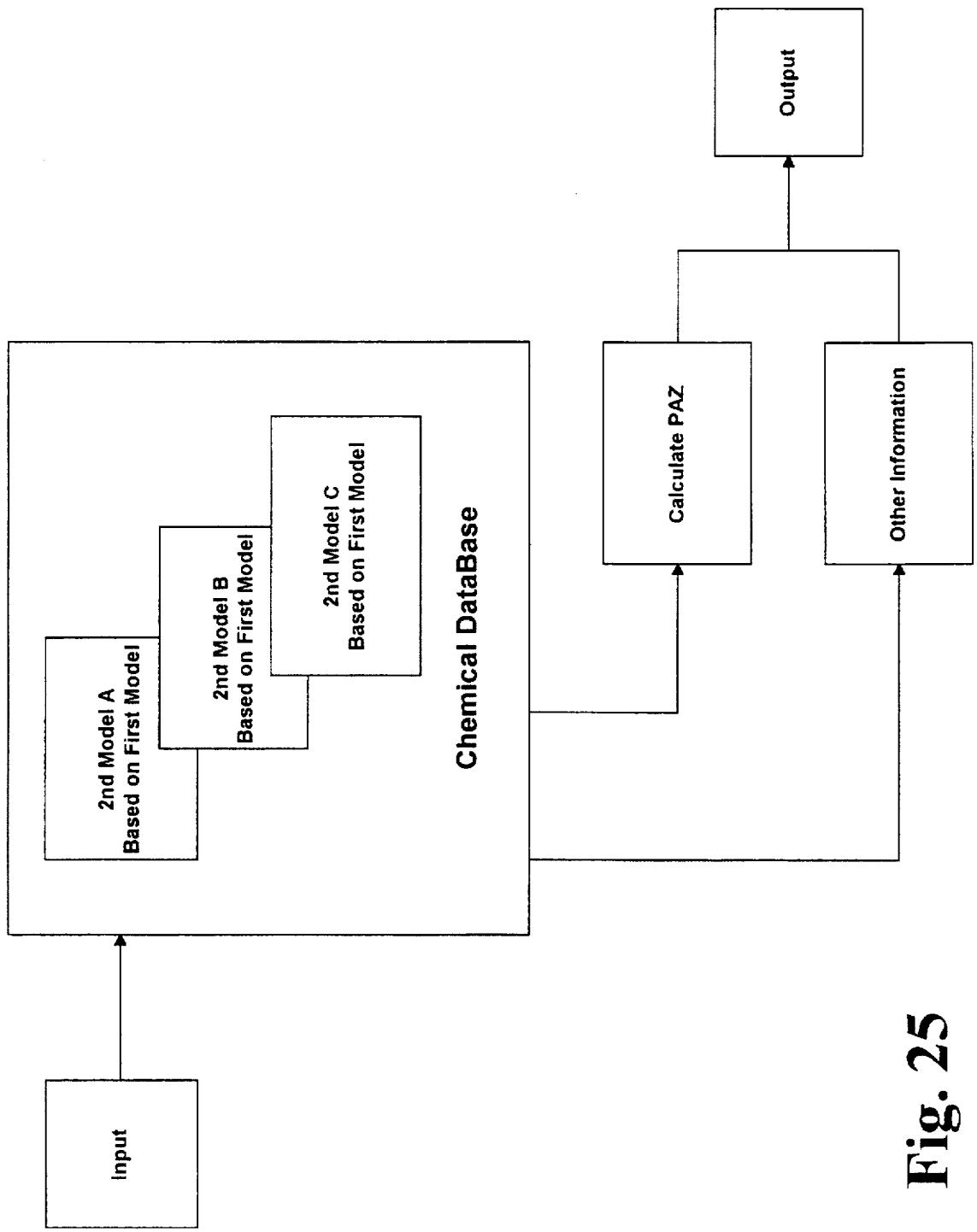
FIG. 25 shows a block diagram of at least one aspect of the present invention of using a second model related to a first model and may include selecting a particular second model from a group of second models.

Another aspect of the present invention is to input information into the chemical database upon which the chemical database could select a model, as shown in FIG. 25. This particular model could be a second model based upon a first model. The first model could have one goal such as accuracy as may be typical of a highly complex, theoretical model. The second model based upon the first model could have a goal of operational efficiency. Also, the first and second goals may even differ only in matter of degree, as well as in concepts. Naturally, the two models could have the same goal. One aspect of this invention is the second model would be based not on the experimental data, but on the results from the first model, where the first model might be a complex, theoretical model which might be based upon the experimental and actual data. Likewise, the first model might have a goal of correlation of physical phenomena that also might be based on the experimental and actual data. The second model might be concerned primarily with rapid calculational time that could be less than the first model. However, since the second model output is based upon the first model's output, the second model's output may have a relatively close relation to the output of the first model. Naturally, there could be multiple second models as shown in FIG. 25 that could be related to individual chemical identifiers or other criteria. Thus, a particular chemical identifier could be used to select a particular second model to calculate a predicted response. As discussed above, if insufficient information were available to use the second model to calculate a predicted response, the preferred embodiment may display other chemically related information and a protective action zone that may be electronically obtained in one single unit as opposed to looking up the similar response from a separate NAERG book. After calculating the predicted response or accessing other chemically related information, an output may be obtained which may be a visual, audible, or other suitable output.

Figure 26:
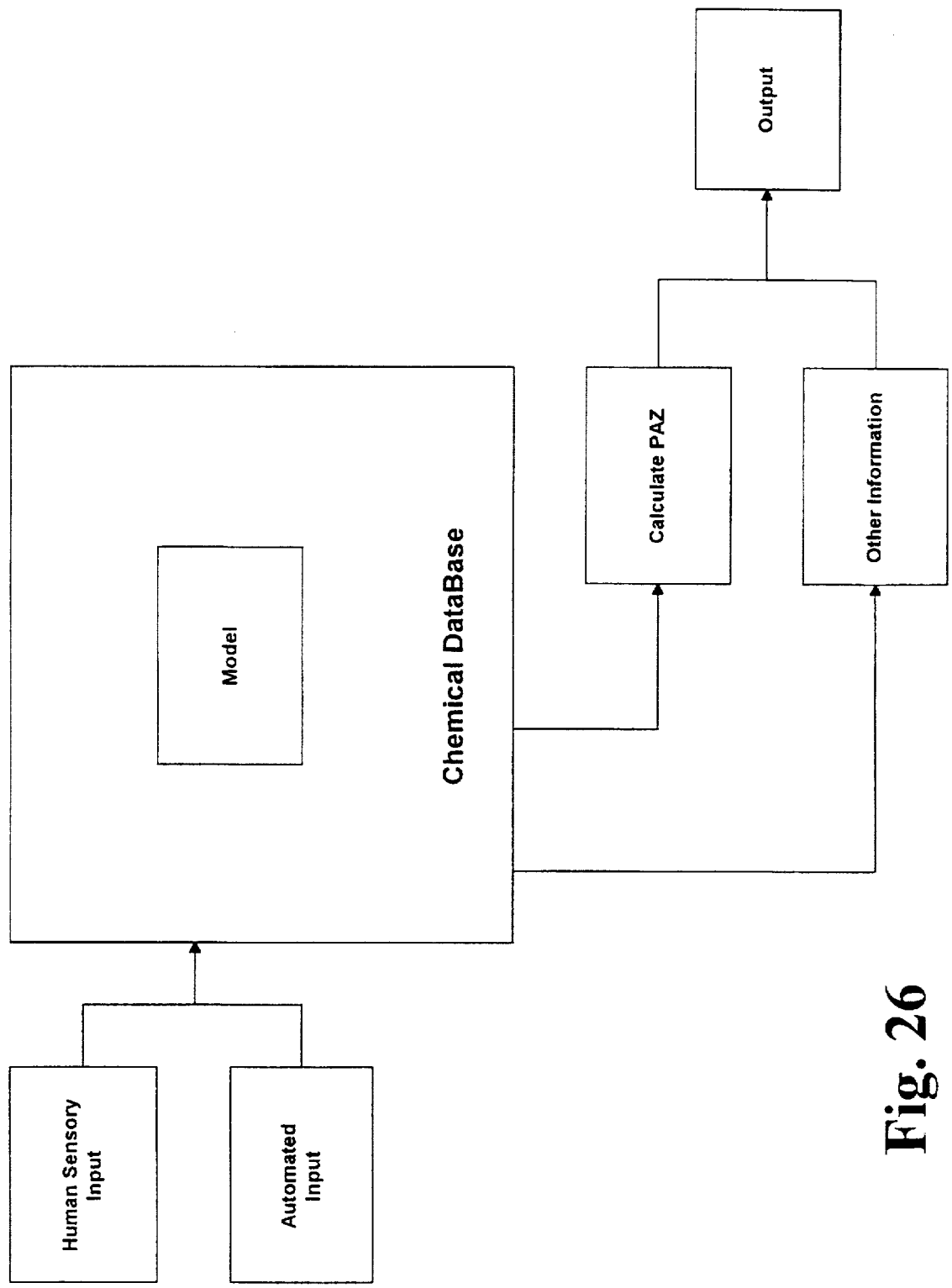
FIG. 26 shows a block diagram of at least one aspect of the present invention using human sensory input and automated input, which could be optional, in using the present invention system and methods.

A third aspect of the present invention is shown in FIG. 26 and has been described above. This aspect of the invention focuses upon human sensory input, and in some cases, automated input such as default values. This input may be used by stored chemical information and a model to calculate the results of a protective action zone. Thus, a protective action zone could include recommended actions as well as distances, concentrations, and other information that could be useful when responding to a chemical release. Similarly, if sufficient information is unavailable to calculate the results using the model, the preferred embodiment may supply more general information or even information contained in other guidebooks, such as the NAERG, to provide a unitary source that is readily available and convenient for the first responder and other personnel.

Figure 27:
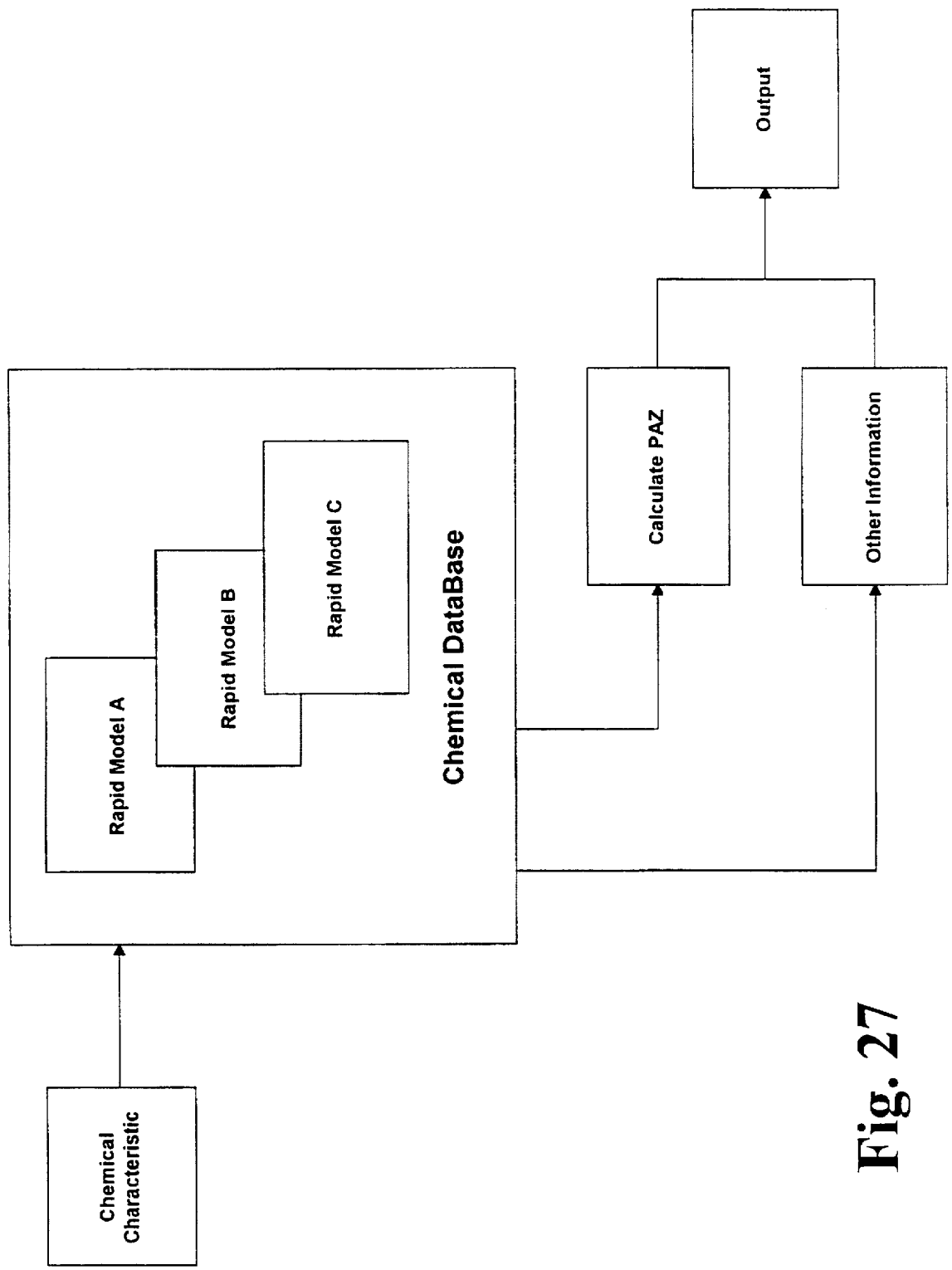
FIG. 27 shows a block diagram of at least one aspect of the present invention using a rapid calculational model with a low computational complexity, which could be selected from a group of rapid calculational models.

Another aspect of the present invention may focus on the low computational complexity of the model which results in rapid calculations, as shown in FIG. 27. This aspect may be particularly applicable to a dense gas dispersion model. This aspect may be contrasted to those models which use a passive gas dispersion analysis to predict a dense gas dispersion. The computational complexity is defined in the numerical reference book referred to above. For instance, in the preferred embodiment, a preferred low computational complexity could yield a calculational time to produce results at least approximately ten times more rapid than more complex models, such as described above. It is a recognized manner of evaluating models and their calculational speed. The present invention may use models that vastly reduces the computational complexity resulting in more rapid results by approximately ten times faster or more, compared to the traditional state of the art theoretical models such as SLAB, among others, as shown in appendix 2. The input of the chemical characteristics or other information may be made in the electronic calculating element. The contained information in the electronic calculating element then may correlate the chemical characteristics to a rapid calculational model to use in calculating a zone. Likewise, the rapid calculational model may be selected from a set of several rapid calculational models that are correlated to a chemical or a group of chemicals by a chemical characteristic which could be a chemical identifier.

Figure 28:
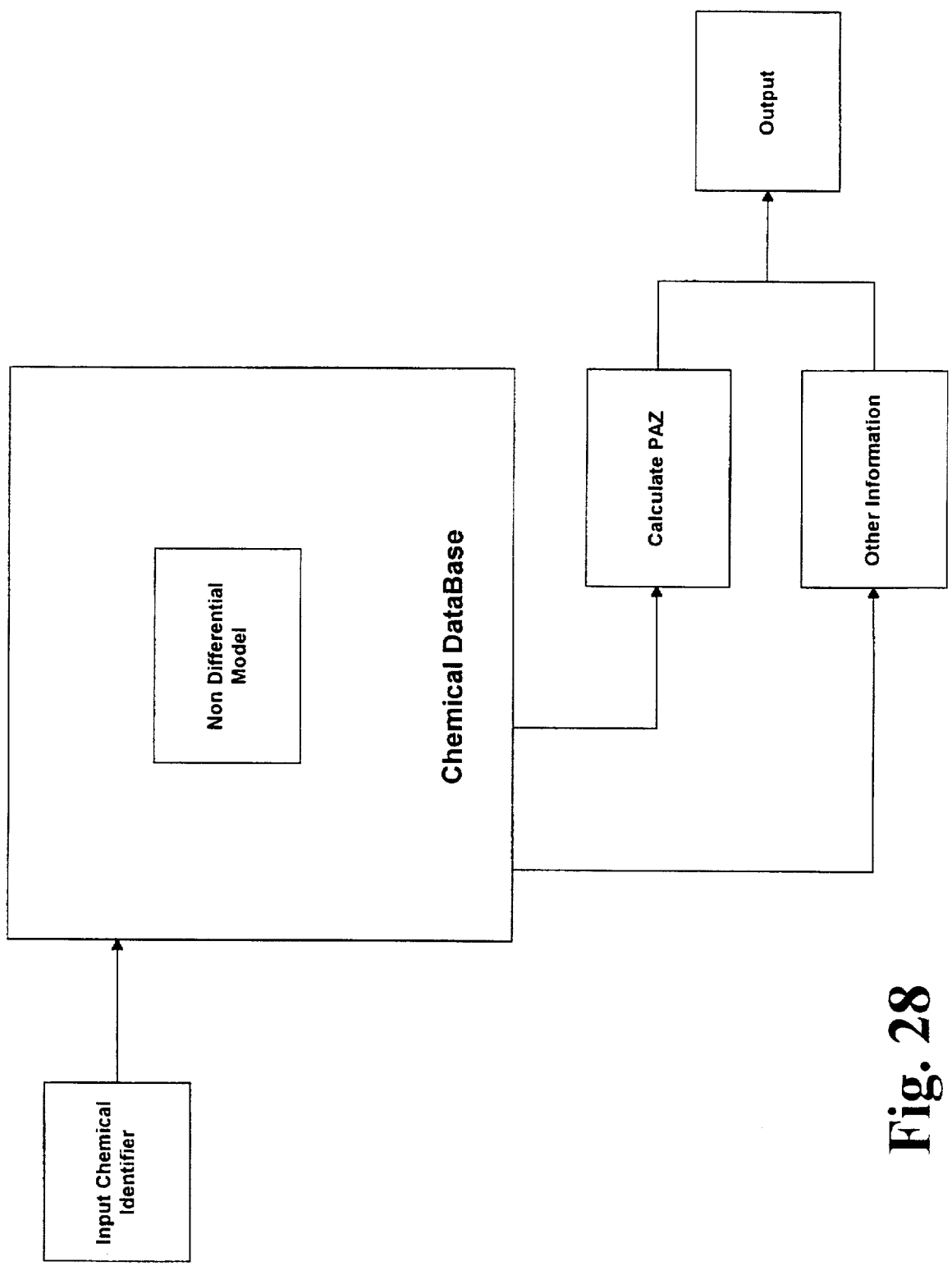
FIG. 28 shows a block diagram of at least one aspect of the present invention using a non differential model based on previously modeled data, which could be selected from a group of non-differential models.

Another aspect of the present invention may focus on the particular model that the present invention may use, namely, a non-differential model, as shown in FIG. 28. Typically, this model could be based on previously modeled data, as described above. Processors found on portable units, such as a palmtop computer, typically do not have the processing speed that high end processors, such as desktop units, may contain. Therefore, one element of this invention was to develop a model that would perform satisfactorily on slower processors. Obviously, such a model would perform even faster on a high end processor. The present invention could be used on a high end processor with relative ease such as might be found on laptop computers, desktop computers, host computers, as well as on low end processors, such as palmtop computers. Such a model could include a non-differential gas dispersion model. Similarly, this non-differential model could be based on previously modeled data produced by highly complex, theoretical models. In this aspect, a chemical identifier could be input into the chemical information contained in a chemical database and correlated to a particular model to calculate a protective action zone. This model, being a non-differential model, could be selected from a set of non-differential models. These models could include non-differential polynomial models and could include neural network and lookup tables. Naturally, the non-differential models could also be a rapid calculational model as discussed above with a low computational complexity.

The preferred embodiment has primarily been discussed above in terms of chemical toxicity levels. However, the present invention encompasses other aspects of protective action zone as well. For instance, pressure waves can occur from explosions. Chemical concentration may be of insignificant effect under such conditions at extended distances. However, a pressure wave breaking glass and destroying structures may provide a harmful exposure such that a protective action zone could be calculated using the models described and produce a corresponding protective action zone specifically designed for harmful pressure exposure. Likewise, flammability exposure could be a consideration. Similar modeling techniques as described could be used to produce protective action zones for flammability exposure. As just one example of using alternative levels of concern, if one desired to find a protective action zone for flammability, one could use a dense gas dispersion analysis to find an upper explosive limit and a lower explosive limit. Between these two limits, a potentially harmful area of concern could occur. Thus, a protective action zone could be determined. Another example could be excessive noise levels, where a protective action zone could equally be calculated. The analysis, steps, and modeling techniques could be applicable for these and other areas, in which a protective action zone that could predict areas of harmful exposure for humans or other life or property, are envisioned by the present invention.

As can be easily understood, the basic concepts of the present invention may be embodied in a variety of ways. It involves both methods and devices to accomplish the appropriate method. The methods that may be claimed in this invention are natural outgrowths of the apparatus claims and could include other steps as would naturally occur with the above disclosure. Therefore, no separate discussions of the methods are deemed necessary as they may claim steps that are implicit in the use and manufacture of the apparatus claims. Furthermore, although the steps may be organized in a logical fashion, however, other sequences can and do occur. Therefore, any method claims should not be construed to include only the order of the sequence of steps presented. In addition, while some devices are disclosed, it would be understood that these not only accomplish certain methods but also can be varied in many ways. Importantly, as to the foregoing, all these facets should be understood to be encompassed by this disclosure.

The foregoing discussion and claims that may follow describe only the preferred embodiments of the present invention. While particular embodiments of the invention have been described, it will be obvious that changes and modifications, as well as different permutations of the claims, may be made without departing from the broad aspects of the present invention.

Any references mentioned in the application for this patent as well as all references listed in any information disclosure filed with the application are hereby incorporated by reference in their entirety to the extent such may be deemed essential to support the enablement of the invention (s), however, to the extent statements might be considered inconsistent with the patenting of this/these invention(s) such statements are expressly not to be considered as made by the applicant(s).

Particularly with respect to the claims, it should be understood that a number of changes may be made without departing from its essence. In this regard, it is intended that such changes-to the extent that they substantially achieve the same results in substantially the same way-would still fall within the scope of the present invention. It is simply not practical to describe and claim all possible revisions and claims to the present invention that may be accomplished. To the extent such revisions utilize the essence of the present invention, each would naturally fall within the breadth of protection by any patent granted. This is particularly true for the present invention since most of the basic concepts are fundamental in nature and it can be easily applied.

APPENDIX 1

| | ITERATION VS DIRECT SOLUTIONS Equation: $y^2 = 2x + 3$  Solve for $x = 5$ | | | | |
|---|---|---|---|---|---|
| | Iterative | | | | Direct |
| | $y = (2x + 3)/y$ Yguess | Yresult | Yguess − Yresult | Iteration | $y = \text{Sqrt}(2x + 3)$ Yresult |
| Initial Guess | 1 | 13 | −12 | 1 | 3.605551275 |
| (Yguess + Yresult)/2 | 7 | 1.857143 | 5.142857143 | 2 | |
| (Yguess + Yresult)/2 | 4.428571 | 2.935484 | 1.493087558 | 3 | |
| (Yguess + Yresult)/2 | 3.682028 | 3.530663 | 0.151364321 | 4 | |
| (Yguess + Yresult)/2 | 3.606345 | 3.604757 | 0.001588253 | 5 | |
| (Yguess + Yresult)/2 | 3.605551 | 3.605551 | 1.74907E-07 | 6 | |
| Initial Guess | 20 | 0.65 | 19.35 | 1 | |
| (Yguess + Yresult)/2 | 10.325 | 1.25908 | 9.065920097 | 2 | |
| (Yguess + Yresult)/2 | 5.79204 | 2.2446 | 3.547580295 | 3 | |
| (Yguess + Yresult)/2 | 4.01825 | 3.235239 | 0.783010425 | 4 | |
| (Yguess + Yresult)/2 | 3.626745 | 3.584482 | 0.042262786 | 5 | |
| (Yguess + Yresult)/2 | 3.605613 | 3.605489 | 0.000123845 | 6 | |
| (Yguess + Yresult)/2 | 3.605551 | 3.605551 | 1.06346E-09 | 7 | |

APPENDIX 2

| Chemical<br>y^2 = 2x + 3 | Type of<br>Release | Average Execution Time Over 5 Executions | | | Performance Increase | |
|---|---|---|---|---|---|---|
| | | SLAB<br>Seconds | ALOHA<br>Seconds | PEAC<br>Seconds | SLAB/PEAC | ALOHA/PEAC |
| Ammonia | Continuous | 5.6 | 1.16 | 0.033 | 170 | 35 |
| Bromine | Continuous | 18.2 | 2.23 | 9.044 | 416 | 51 |
| Chlorine | Continuous | 6.2 | 2.04 | 0.044 | 141 | 46 |
| Ammonia | Puff | 5.0 | 0.80 | 0.011 | 455 | 72 |
| Bromine | Puff | 5.0 | 1.19 | 0.033 | 152 | 36 |
| Chlorine | Puff | 5.2 | 1.18 | 0.055 | 95 | 21 |
| AVERAGES | | 7.53 | 1.43 | 0.037 | 238 | 44 |

We claim:

1. An emergency chemical release response method comprising the steps of:
   a. accepting an electronic representation of at least a chemical identifier by an electronic calculating element;
   b. electronically selecting at least one type of model of response determination from alternative models related to said chemical identifier;
   c. utilizing said model in said electronic calculating element;
   d. determining a protective action zone through use of said electronic calculating element; and
   e. outputting a result of said protective action zone on at least a visual output element connected to said electronic calculating element.

2. An emergency chemical release response method as described in claim 1 wherein said step of electronically selecting at least one type of model comprises the step of electronically selecting a non differential model.

3. An emergency chemical release response method as described in claim 1 wherein said model comprises a dense gas dispersion model.

4. An emergency chemical release response method as described in claim 1 wherein said model comprises a direct solution model.

5. An emergency chemical release response method as described in claim 2 wherein said step of electronically selecting at least one type of model comprises the step of electronically selecting a non differential polynomial model.

6. An emergency chemical release response method as described in claim 1 wherein said step of electronically selecting at least one type of model comprises the step of electronically selecting a neural network model.

7. An emergency chemical release response method as described in claim 1 wherein said step of electronically selecting at least one type of model comprises the step of electronically selecting a lookup table model.

8. An emergency chemical release response method as described in claim 1 further comprising the steps of:
   a. identifying a chemical based on said chemical identifier;
   b. determining whether said chemical has a toxicity level index associated with said chemical; and
   c. utilizing an output of said step of determining whether said chemical has said toxicity level index in the step of electronically selecting at least one type of model of response determination.

9. An emergency chemical release response method as described in claim 1 wherein said step of determining said protective action zone comprises the steps of utilizing significant effect parameters and excluding preselected low effect parameters.

10. An emergency chemical release response method as described in claim 9 wherein said step of utilizing significant effect parameters comprises the step of providing sufficient significant effect parameters to approximate differential models.

11. An emergency chemical release response method as described in claim 1 wherein said step of electronically selecting at least one type of model comprises the step of electronically selecting multiple models and wherein said step of determining said protective action zone comprises the steps of:
   a. initially utilizing at least one model to approximate an intermediate protective action zone with significant effect parameters;
   b. intermediately outputting said intermediate protective action zone; and
   c. subsequently more thoroughly determining a more thorough protective action zone with at least one additional low effect parameter.

12. An emergency chemical release response method as described in claim 1 wherein said step of determining said protective action zone with said electronic calculating element consists of the step of utilizing a palmtop computer.

13. An emergency chemical release response method as described in claim 1 wherein said step of electronically selecting at least one type of model of response determination from alternative models based on said chemical identifier comprises the step of selecting a rapid calculational model.

14. An emergency chemical release response method as described in claim 1 wherein said step of determining said protective action zone through use of said electronic calculating element in which calculation occurs for a user without the user directly referring to other reference materials.

15. An emergency chemical release response system comprising:
   a. an electronic calculating element;
   b. an electronic memory connected with said electronic calculating element;
   c. an input element connected to said electronic calculating element to allow at least a chemical identifier input;
   d. a chemical database stored in said memory in which said chemical identifier is associated with said chemical database;
   e. at least one type of model of response determination based on said chemical identifier selected from a set of alternative models stored in said memory; and
   f. at least a visual output element connected to said electronic calculating element.

16. An emergency chemical release response system as described in claim 15 wherein at least one of said models comprises a non differential model.

17. An emergency chemical release response system as described in claim 15 wherein at least one of said models comprises a non differential polynomial model.

18. An emergency chemical release response system as described in claim 15 wherein at least one of said models comprises a dense gas dispersion model.

19. An emergency chemical release response system as described in claim 15 wherein at least one of said models comprises a direct solution model.

20. An emergency chemical release response system as described in claim 15 wherein at least one of said models comprises a neural network model.

21. An emergency chemical release response system as described in claim 15 wherein at least one of said models comprises a lookup table model.

22. An emergency chemical release response system as described in claim 15 wherein said chemical database further comprises a toxicity level index associated with said chemical release and at least one of said models is affected by said toxicity level index.

23. An emergency chemical release response system as described in claim 15 wherein said input comprises significant effect parameters and excludes preselected low effect parameters.

24. An emergency chemical release response system as described in claim 22 wherein said input comprises significant effect parameters and excludes preselected low effect parameters.

25. An emergency chemical release response system as described in claim 24 wherein said significant effect parameters are sufficient to approximate differential models.

26. An emergency chemical release response system as described in claim 23 wherein said significant effect parameters are sufficient to approximate differential models.

27. An emergency chemical release response system as described in claim 15 wherein said electronic calculating element consists of a palmtop computer.

28. An emergency chemical release response system as described in claim 15 wherein at least one of said models and said chemical database are configured to not require a user to directly refer to other reference materials.

29. An emergency chemical release response method comprising the steps of:
  a. electronically utilizing a second model of a chemical identifier with a second goal in an electronic calculating element selected from alternative models of response determination related to said chemical identifier wherein said second model is developed from a first model of said chemical identifier with a first goal and wherein said first model is corresponded to said alternative models of response determination related to said chemical identifier;
  b. electronically accessing a database containing information related to at least one selected chemical;
  c. accepting an electronic input of at least one parameter related to said chemical identifier;
  d. calculating a protective action zone by said electronic calculating element for said chemical release utilizing said step of electronically utilizing said second model of said chemical identifier; and
  e. outputting a result of said protective action zone on at least a visual output element connected to said electronic calculating element.

30. An emergency chemical release response method as described in claim 29 further comprising the step of first modeling of said chemical release to develop said first model of said chemical identifier with said first goal.

31. An emergency chemical release response method as described in claim 29 wherein said first model of said chemical identifier with said first goal comprises a first goal of accuracy.

32. An emergency chemical release response method as described in claim 29 wherein said step of electronically utilizing said second model of said chemical identifier with said second goal comprises the step of utilizing said second model based on a second goal of operational efficiency.

33. An emergency chemical release response method as described in claim 29 wherein said first model of said chemical identifier with said first goal comprises a first goal of correlation to physical phenomena.

34. An emergency chemical release response method as described in claim 29 wherein said step of electronically utilizing said second model of said chemical identifier with said second goal comprises the step of utilizing said second model based on a second goal of rapid calculational time.

35. An emergency chemical release response method as described in claim 29 wherein at least one of said alternative models which said first model is corresponded thereto comprises a dense gas dispersion model.

36. An emergency chemical release response method as described in claim 29 wherein at least one of said alternative models which said first model is corresponded thereto comprises an iterative solution model.

37. An emergency chemical release response method as described in claim 29 wherein at least one of said alternative models which said second model is selected therefrom comprises a direct solution model.

38. An emergency chemical release response method as described in claim 29 wherein said step of electronically utilizing said second model of said chemical identifier with said second goal comprises the step of retaining said second model in said electronic calculating element.

39. An emergency chemical release response method as described in claim 29 wherein said step of accepting said electronic input comprises the step of accepting significant effect parameters input.

40. An emergency chemical release response method as described in claim 29 wherein said step of accepting said electronic input comprises the step of providing optional qualitative and quantitative categories.

41. An emergency chemical release response method as described in claim 29 wherein said step of accepting said electronic input comprises the step of providing optional defaults.

42. An emergency chemical release response method as described in claim 29 wherein said step of electronically utilizing said second model of said chemical identifier with said second goal comprises the step of utilizing a non differential model.

43. An emergency chemical release response method as described in claim 29 wherein said step of electronically utilizing said second model of said chemical identifier with said second goal comprises the step of utilizing a non differential polynomial model.

44. An emergency chemical release response method as described in claim 29 wherein said step of electronically utilizing said second model comprises the step of electronically utilizing a neural network model.

45. An emergency chemical release response method as described in claim 29 wherein said electronically utilizing said second model of said chemical identifier with said second goal comprises the step of utilizing a lookup table model.

46. An emergency chemical release response method as described in claim 29 wherein said step of calculating said protective action zone occurs for a user without requiring the user to directly refer to other reference materials.

47. An emergency chemical release response method as described in claim 29 wherein said step of calculating said protective action zone consists of the step of utilizing a palmtop computer.

48. An emergency chemical release response system comprising:
   a. an electronic calculating element;
   b. an electronic memory connected to said electronic calculating element;
   c. an input element connected to said electronic calculating element to allow at least a chemical identifier input;
   d. a chemical database contained in said memory in which said chemical identifier is associated with said chemical database;
   e. a second model of a chemical identifier with a second goal stored in said memory wherein said second model is developed from a first model of said chemical identifier with a first goal and wherein said second model is selected from alternative models of response determination related to said chemical identifier; and
   f. at least a visual output element connected to said electronic calculating element.

49. An emergency chemical release response system as described in claim 48 wherein said first goal comprises accuracy.

50. An emergency chemical release response system as described in claim 48 wherein said second goal comprises operational efficiency.

51. An emergency chemical release response system as described in claim 48 wherein said first goal comprises correlation to physical phenomena.

52. An emergency chemical release response system as described in claim 48 wherein said second goal comprises rapid calculational time.

53. An emergency chemical release response system as described in claim 48 wherein said second model is retained in said electronic calculational element.

54. An emergency chemical release response system as described in claim 48 wherein said input comprises significant effect parameters.

55. An emergency chemical release response system as described in claim 48 wherein said input comprises optional qualitative and quantitative input.

56. An emergency chemical release response system as described in claim 48 wherein said input comprises optional defaults.

57. An emergency chemical release response system as described in claim 48 wherein at least one of said alternative models which said second model is selected therefrom comprises a non differential model.

58. An emergency chemical release response system as described in claim 48 wherein at least one of said alternative models which said second model is selected therefrom comprises a non differential polynomial model.

59. An emergency chemical release response system as described in claim 48 wherein at least one of said alternative models which said second model is selected therefrom comprises a neural network model.

60. An emergency chemical release response system as described in claim 48 wherein at least one of said alternative models which said second model is selected therefrom comprises a lookup table model.

61. An emergency chemical release response system as described in claim 48 wherein said second model and said chemical database are configured to not require a user to directly refer to other reference materials.

62. An emergency chemical release response system as described in claim 48 wherein said electronic calculating element consists of a palmtop computer.

63. An emergency chemical release response method comprising the steps of:
   a. providing chemical information on an electronic calculating element to include at least a chemical identifier associated with said chemical information;
   b. electronically utilizing at least one type of model of response determination from alternative models related to said chemical identifier on said electronic calculating element;
   c. limiting prompting for input to optional human sensory input and automated input;
   d. prompting for said input;
   e. calculating a protective action zone based on said optional human sensory input and automated input with said model on said electronic calculating element; and
   f outputting on a visual output element a result of said protective action zone wherein said visual output element is connected to said electronic calculating element.

64. An emergency chemical release response method as described in claim 63 wherein said step of calculating said protective action zone occurs for a user without requiring the user to directly refer to other reference materials.

65. An emergency chemical release response method as described in claim 63 wherein said step of calculating said protective action zone comprises the step of calculating utilizing significant physical and meteorological parameters and excluding preselected low effect parameters.

66. An emergency chemical release response method as described in claim 63 wherein said step of prompting for optional human sensory input and automated input comprises the step of providing optional defaults.

67. An emergency chemical release response method as described in claim 63 wherein said step of calculating said protective action zone comprises the step of calculating with a rapid calculational model.

68. An emergency chemical release response system comprising:
   a. an electronic calculating element;
   b. an electronic memory connected to said electronic calculating element;
   c. an input element connected to said electronic calculating element for at least a chemical identifier input and limited to optional human sensory input and automated input;
   d. a chemical database contained in said memory in which said chemical identifier is associated with said chemical database to identify a chemical;
   e. at least one type of model of response determination from alternative models related to said chemical identifier on said electronic calculating element; and
   f. at least a visual output element connected to said electronic calculating element.

69. An emergency chemical release response system as described in claim 68 wherein at least one of said models and said chemical database are configured to not require a user to directly refer to other reference materials.

70. An emergency chemical release response system as described in claim 68 wherein said input comprises significant physical and meteorological parameters and excludes preselected low effect parameters.

71. An emergency chemical release response system as described in claim 68 wherein said input comprises optional defaults.

72. An emergency chemical release response system as described in claim 68 wherein at least one of said models comprises a rapid calculational model.

73. An emergency chemical release response method as described in claim 68 wherein at least one if said models comprises a dense gas dispersion model.

74. An emergency chemical release response method as described in claim 68 wherein at least one of said models comprises a direct solution model.

* * * * *